(12) United States Patent
Kim et al.

(10) Patent No.: US 9,069,447 B2
(45) Date of Patent: Jun. 30, 2015

(54) MOBILE TERMINAL AND METHOD FOR SHARING INFORMATION ASSOCIATED WITH E-BOOK

(75) Inventors: Miyoung Kim, Pocheon-si (KR); Yoomee Song, Seoul (KR); Younghoon Song, Seoul (KR); Minjeong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 231 days.

(21) Appl. No.: 13/407,711

(22) Filed: Feb. 28, 2012

(65) Prior Publication Data
US 2012/0260163 A1 Oct. 11, 2012

(30) Foreign Application Priority Data

Apr. 6, 2011 (KR) .......... 10-2011-0031616
Apr. 13, 2011 (KR) .......... 10-2011-0034186

(51) Int. Cl.
| G06F 3/048 | (2013.01) |
| G06F 3/0483 | (2013.01) |
| G06F 3/0485 | (2013.01) |
| G06F 15/02 | (2006.01) |
| G06F 3/0488 | (2013.01) |
| G06F 3/0481 | (2013.01) |

(52) U.S. Cl.
CPC ............ *G06F 3/0483* (2013.01); *G06F 3/0485* (2013.01); *G06F 15/0283* (2013.01); *G06F 3/04883* (2013.01); *G06F 3/04817* (2013.01)

(58) Field of Classification Search
USPC .................. 715/863, 764, 763, 776
See application file for complete search history.

(56) References Cited

U.S. PATENT DOCUMENTS

| 2003/0009459 A1 | 1/2003 | Chastain et al. |
| 2004/0201633 A1 | 10/2004 | Barsness et al. |
| 2007/0204078 A1* | 8/2007 | Boccon-Gibod et al. ........ 710/54 |
| 2011/0191701 A1* | 8/2011 | Kim et al. ..................... 715/763 |

FOREIGN PATENT DOCUMENTS

| EP | 2273408 | 1/2011 |
| EP | 2500810 | 9/2012 |

(Continued)

OTHER PUBLICATIONS

Bajaj et al., Office 2008 for Mac All-in-One for Dummies®, For Dummies, Oct. 12, 2009, pp. 91-102.*

(Continued)

*Primary Examiner* — Kieu Vu
*Assistant Examiner* — Joy M Weber
(74) *Attorney, Agent, or Firm* — Lee, Hong, Degerman, Kang & Waimey

(57) ABSTRACT

A mobile terminal includes a controller, a touch screen, a memory configured to store a first list of at least one e-book of a first user and first reading progress information for each of the at least one e-book of the first user, and a communication module configured to receive e-book information including a second list of at least one e-book of a second user and second reading progress information for each of the at least one e-book of the second user. The controller is configured to display at least one icon on the touch screen, each of the at least one icon representing one of the at least one e-book in the first list or one of the at least one e-book in the second list, and display the first and second reading progress information corresponding to at least one e-book included in both the first and second lists.

32 Claims, 26 Drawing Sheets

(56) References Cited

FOREIGN PATENT DOCUMENTS

| | | |
|---|---|---|
| KR | 20100133819 | 12/2010 |
| WO | 2010/125768 | 11/2010 |

OTHER PUBLICATIONS

European Patent Office Application Serial No. 12000858.6, Search Report dated Jan. 16, 2013, 18 pages.

* cited by examiner

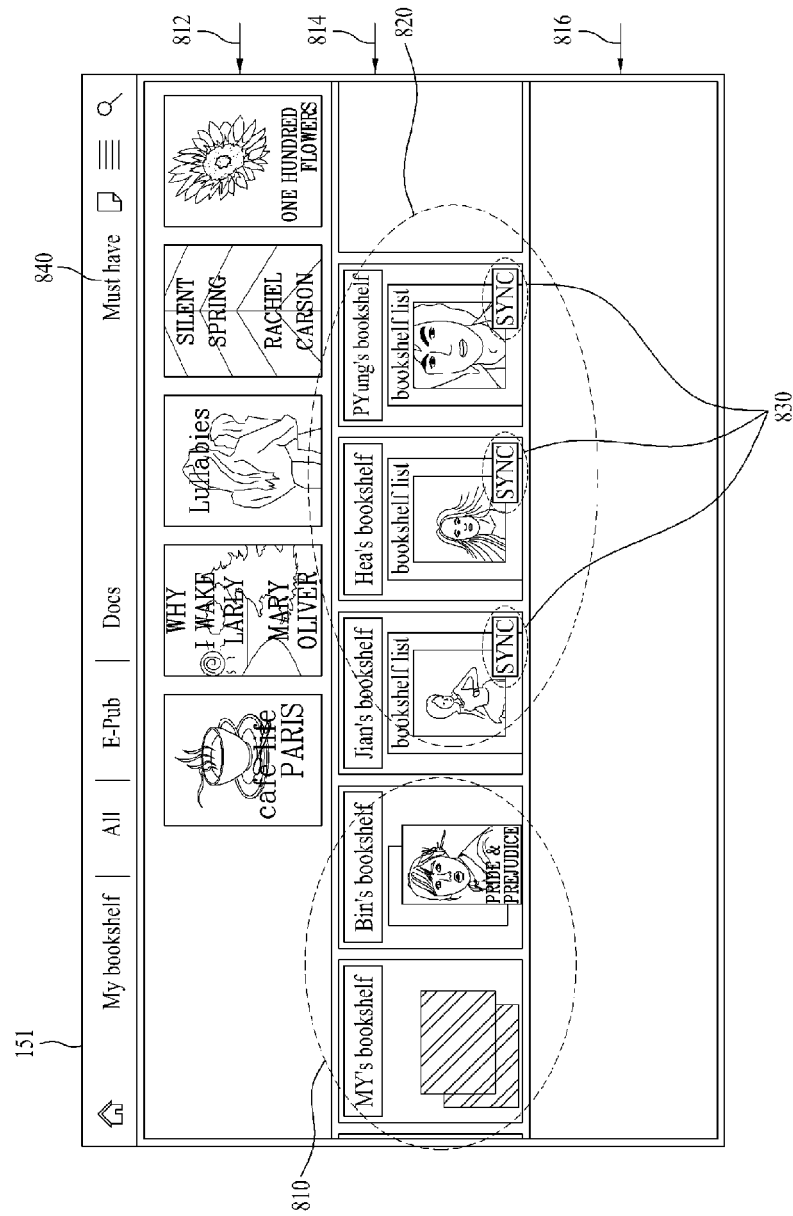

FIG. 15

Popular phrase view — 1510

Nick Carraway, the narrator, is a young bachelor from a patrician Midwestern family, who graduates from Yale in 1915. After fighting in World War I, he returns to the Midwest before settling in New York City to "learn the bond business." Despite his wealthy upbringing, Nick lives very modestly. Nick explains that in 1922 he rented a small bungalow between two mansions in West Egg, a wealthy community on Long Island Sound. Across the bay was East Egg, inhabited by the "old aristocracy," including Tom and Daisy Buchanan, second cousin once removed and Nick knew of Tom, a football player at New Haven. Nick describes the Buchanans in a visit to their East Egg mansion: although phenomenally wealthy, Tom's glory days are behind him; he is a dilettante. Daisy, although engaging and attractive, is pampered and superficial, largely ignoring her three-year-old daughter. Daisy's friend Jordan Baker, a well known female golfer, shows an interest in Nick and tells him that Tom has a mistress in New York City. One day Tom and Nick take a train ride together to New York and on the way they stop at a shabby garage owned by George Wilson, where Nick is introduced to the owner's wife, Myrtle (Tom's mistress). Nick accompanies Tom and Myrtle to their Manhattan love-nest, where Myrtle presides over a pretentious party that includes her sister and several others.

The Great Gatsby
- F. Scott Fitzgerald 1520, 1530

FIG. 16

Nick Carraway, the narrator, is a young bachelor from a patrician Midwestern family, who graduates from Yale in 1915. After fighting in World War I, he returns to the Midwest before settling in New York City to "learn the bond business." Despite his wealthy upbringing, Nick lives very modestly. Nick explains that in 1922 he rented a small bungalow between two mansions in West Egg, a wealthy community on Long Island Sound. Across the bay was East Egg, inhabited by the [Comment], including Tom and (Daisy) Buchanan. Daisy is Nick's second cousin once removed and Nick knew of Tom, a football player at New Haven. Nick describes the Buchanans in a visit to their East Egg mansion: although phenomenally wealthy,

* Daisy, sometimes known as Daisy Girl or Peace Little Girl–jane.lee
Re: I love Daisy Girl–joowon.Kim
Re: Me, too.–Lime.Gil Tom's glory days are behind him; he is a dilettante. Daisy, although engaging and attractive, is pampered and superficial, largely ignoring her three-year-old daughter. Daisy's friend Jordan Baker, a well-known female golfer, shows an interest in Nick and tells him that Tom has a mistress in New York City. One day Tom and Nick take a train ride together to New York and on the way they stop at a shabby garage owned by George Wilson, where Nick is introduced to the owner's wife, Myrtle (Tom's mistress). Nick accompanies Tom and Myrtle to their Manhattan love-nest, where Myrtle presides over a pretentious party that includes her sister and several others.
Nick learns that Tom and Myrtle began their The Great Gatsby
- F. Scott Fitzgerald

[Reply]

151
1620
1610
1630
1640

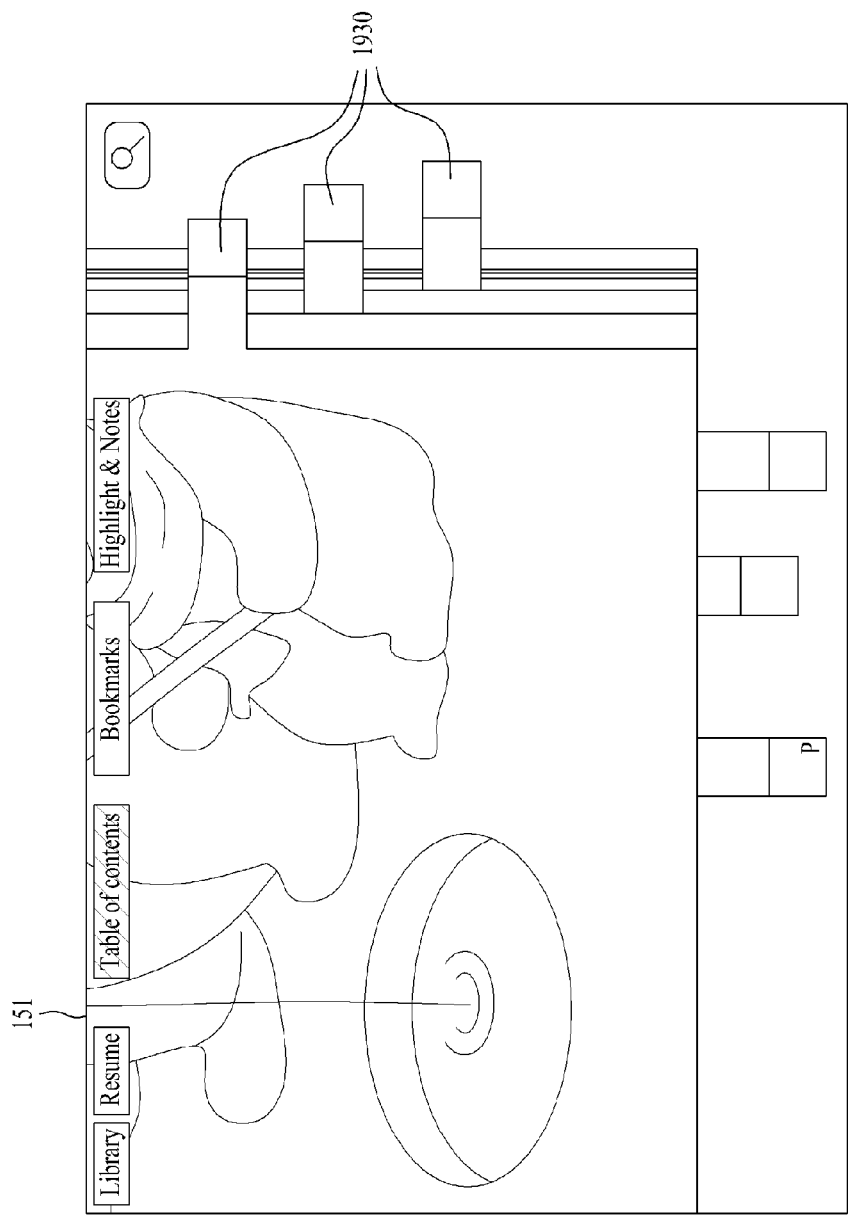

MOBILE TERMINAL AND METHOD FOR SHARING INFORMATION ASSOCIATED WITH E-BOOK

CROSS-REFERENCE TO RELATED APPLICATIONS

Pursuant to 35 U.S.C. §119(a), this application claims the benefit of earlier filing date and right of priority to Korean Patent Application Nos. 10-2011-0034186, filed on Apr. 13, 2011, and 10-2011-0031616, filed on Apr. 6, 2011, the contents of which are all hereby incorporated by reference herein in their entirety.

FIELD OF THE INVENTION

The present invention relates to a mobile terminal, and more particularly, to a mobile terminal and a method for controlling the mobile terminal.

DESCRIPTION OF THE RELATED ART

Generally, terminals can be classified into mobile or portable terminals and stationary terminals. Furthermore, the mobile terminals can be classified as handheld terminals and vehicle mount terminals according to whether users can carry the terminals on their person.

As the functions of such terminals are diversified, the terminals are implemented as multimedia players equipped with composite functions, such as capturing photos or moving images, playing back music or video files, game play, and receiving broadcasts. To support and increase the functions of such terminals, improvements to the structural parts and/or software parts of the terminals may be considered.

Recently, mobile terminals have begun featuring general e-book displaying functions. An e-book is a special file format that can be viewed via a personal computer (PC) or a portable device, such as a mobile phone, a portable media player (PMP), or a personal digital assistant (PDA). In general, an e-book refers to a special file format in which a digital rights management (DRM) function is loadable for copyright protection, as opposed to universal file formats, such as basic text files. As usage of the social network service (SNS) continues to increase, the need for sharing information associated with e-books with other users also increases. Accordingly, the demand for mobile terminals that facilitate sharing information associated with e-books and methods of controlling such mobile terminals is rapidly increasing.

SUMMARY OF THE INVENTION

Accordingly, the present invention is directed to a mobile terminal and a method for controlling the mobile terminal, which substantially obviate one or more problems due to limitations and disadvantages of the related art.

According to one embodiment, a mobile terminal includes a touch screen configured to display information and receive a user input, a memory configured to store a first list of at least one electronic book (e-book) of a first user and first reading progress information for each of the at least one e-book of the first user, and a communication module configured to receive e-book information including a second list of at least one e-book of a second user and second reading progress information for each of the at least one e-book of the second user. The mobile terminal further includes a controller configured to display at least one icon on the touch screen when the e-book information is received via the communication module, each of the at least one icon representing one of the at least one e-book in the first list or one of the at least one e-book in the second list, and display the first and second reading progress information corresponding to at least one e-book included in both the first list and the second list when a first command is received.

It is contemplated that the controller is further configured to display each of the at least one icon representing only one of the at least one e-book in the first list in a first region of the touch screen, display each of the at least one icon representing only one of the at least one e-book in the second list in a second region of the touch screen, and display each of the at least one icon representing one e-book in both the first and second lists in either the first or second region of the touch screen.

It is contemplated that each of the at least one icon has a shape of a book, and each of the first and second regions has a shape of a bookshelf.

It is contemplated that the controller is further configured to display at least one indicator on the at least one icon, the at least one indicator indicating a presence of at least the first or second reading progress information.

It is contemplated that the at least one indicator includes a first indicator corresponding to the first progress information of the first user and a second indicator corresponding to the second progress information of the second user, and that the controller is further configured to display the first indicator and the second indicator on the at least one icon representing one e-book in both the first and second lists, such that the first indicator is different from the second indicator.

It is contemplated that the first command includes a touch input for moving either the first indicator or the second indicator in a direction where remaining ones of the at least one indicator are displayed.

It is contemplated that at least the first or second reading progress information includes information of multimedia content that was played while reading.

It is contemplated that the e-book information further includes at least copyright information, comment information regarding a comment written by the second user, reading frequency information or reading speed information.

It is contemplated that the controller is further configured to display each item of information included in the e-book information on the at least one icon representing one of the at least one e-book in the second list using visual effects that are different from one another.

It is contemplated that the first user is identified by a first account and the second user is identified by a second account, and that the controller is further configured to display an account list in a prescribed form on the touch screen when a second command is received via the touch screen, the account list including the second account which was added before the first account.

It is contemplated that the account list includes at least a photo of the second user, a name of the second user, an identification (ID) of the second user, an e-book recently purchased by the second user or an e-book currently being read by the second user.

It is contemplated that the account list further includes at least one recommended account in addition to the second account.

It is contemplated that the controller is further configured to display a bookshelf on the touch screen when the second user account is selected from the account list such that the bookshelf includes each of the at least one icon representing one of the at least one e-book in the second list.

It is contemplated that the controller is further configured to display the at least one icon in the second region when the second list is displayed and a third command is received via the touch screen, wherein each of the at least one icon represents one of the at least one e-book in the second list.

It is contemplated that the controller is further configured to display a selection menu in the second region for selecting e-books from the second list when a third command is received via the touch screen.

It is contemplated that the controller is further configured to display one of the at least one icon representing a selected e-book only in the second region.

It is contemplated that the controller is further configured to apply a preset visual effect to a first icon of the at least one icon representing one of the at least one e-book in the second list when a protection attribute has been applied to the one of the at least one e-book in the second list represented by the first icon.

It is contemplated that the protection attribute includes a digital rights management (DRM) attribute.

It is contemplated that the controller is further configured to display each of the at least one icon representing only one of the at least one e-book in the first list in a first region of the touch screen, and display each of the at least one icon representing only one of the at least one e-book in the second list in a second region of the touch screen.

It is contemplated that each of the at least one icon has a shape of a book, and that each of the first and second regions has a shape of a bookshelf.

It is contemplated that the preset visual effect includes a predefined color indicating that the protection attribute has been applied.

It is contemplated that the e-book information further includes at least bookmark information for each of the at least one e-book included in the second list, copyright information of each of the at least one e-book included in the second list, comment information regarding a comment written by the second user, reading frequency information or reading speed information. It is further contemplated that the controller is further configured to display at least the bookmark information or comment information set on the one of the at least one e-book in the second list represented by the first icon in a prescribed form on the touch screen when the one of the at least one e-book in the second list represented by the first icon is selected, and display at least one page of another one of the at least one e-book in the second list on the touch screen when the another one of the at least one e-book is selected and the protection attribute has not been applied to the another one of the at least one e-book.

It is contemplated that the controller is further configured to display at least one portion of a page of the one of the at least one e-book in the second list when the one of the at least one e-book in the second list is selected, such that at least the bookmark information or comment information is displayed on the at least one portion of a page.

It is contemplated that the controller is further configured to display a link to a distributor of the one of the at least one e-book in the second list on the touch screen when the one of the at least one e-book in the second list is selected.

According to one embodiment, a method of controlling a mobile terminal includes storing a first list of at least one electronic book (e-book) of a first user and first reading progress information for each of the at least one e-book of the first user, receiving e-book information including a second list of at least one e-book of a second user and second reading progress information for each of the at least one e-book of the second user, displaying at least one icon on the touch screen when the e-book information is received via the communication module, each of the at least one icon representing one of the at least one e-book in the first list or one of the at least one e-book in the second list, and displaying the first and second reading progress information corresponding to at least one e-book included in both the first list and the second list when a first command is received.

It is contemplated that displaying the first and second reading progress information includes displaying each of the first and second reading progress information as a line graph with respect to a table of contents of the at least one e-book included in both the first list and the second list.

It is contemplated that a slope of the line graph corresponds to a reading speed of the first or second user.

It is contemplated that the method further includes displaying each of the at least one icon representing one of the at least one e-book in the second list in a prescribed form on the touch screen, such that a preset visual effect is applied to a first icon of the at least one icon representing one of the at least one e-book in the second list when a protection attribute has been applied to the one of the at least one e-book in the second list represented by the first icon.

It is contemplated that the method further includes displaying each of the at least one icon representing only one of the at least one e-book in the first list in a first region of the touch screen, and displaying each of the at least one icon representing only one of the at least one e-book in the second list in a second region of the touch screen.

It is contemplated that each of the at least one icon has a shape of a book, and each of the first and second regions has a shape of a bookshelf.

It is contemplated that the preset visual effect is a predefined color indicating that the protection attribute has been applied.

It is contemplated that the e-book information further includes at least bookmark information for each of the at least one e-book included in the second list, copyright information of each of the at least one e-book included in the second list, comment information regarding a comment written by the second user, reading frequency information or reading speed information.

It is contemplated that the method further includes displaying at least the bookmark information or comment information set on the one of the at least one e-book in the second list represented by the first icon in a prescribed form on the touch screen when the one of the at least one e-book in the second list represented by the first icon is selected, and displaying at least one page of another one of the at least one e-book in the second list on the touch screen when the another one of the at least one e-book is selected and the protection attribute has not been applied to the another one of the at least one e-book.

It is contemplated that displaying at least the bookmark information or comment information set on the one of the at least one e-book in the second list represented by the first icon includes displaying at least one portion of a page of the one of the at least one e-book in the second list on which the bookmark information or comment information is set.

It is contemplated that the protection attribute includes a digital rights management (DRM) attribute.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. The aspects, features, and advantages of the present invention will become more apparent upon consideration of the following description of preferred embodiments, taken in conjunction with the accompanying drawing figures. In the drawings:

FIG. 8 is a display screen of a touch screen demonstrating sharing of e-book information of a friend with a user of a mobile terminal in accordance with one embodiment of the present invention.

FIG. 15 is a display screen of a touch screen showing a number of bookmarks or highlights set on an e-book retained by both a friend and the user of a mobile terminal in accordance with one embodiment of the present invention.

FIG. 16 is a display screen of a touch screen for displaying to a user of a mobile terminal a number of memos or comments set on a specific potion of an e-book retained by both the user of the mobile terminal and a friend in accordance with one embodiment of the invention.

FIGS. 19A to 19C are display screens of a touch screen displaying a copyright protected e-book when e-book information is imported into a mobile terminal from a bookshelf of a friend in accordance with one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 3. However, it should be understood that the present invention can also be applied to other types of terminals.

Figure 1:
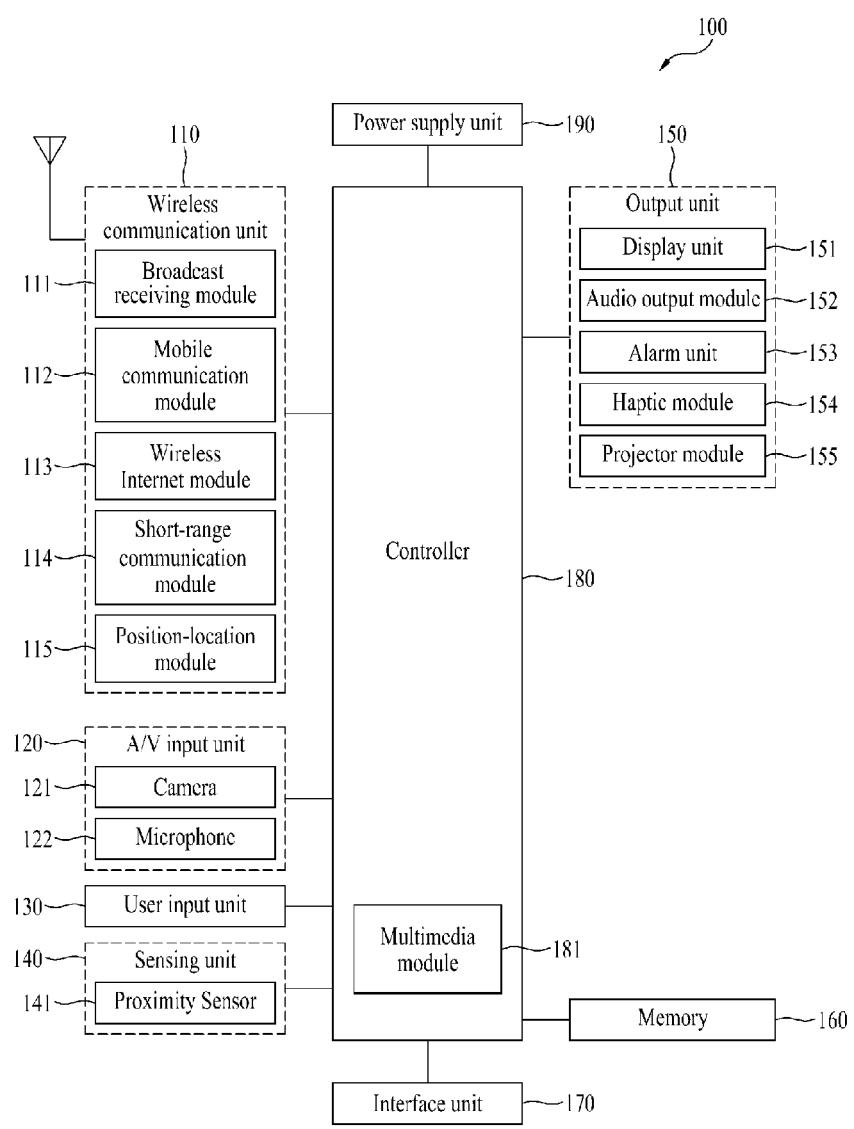
FIG. 1 illustrates a block diagram of the mobile terminal in accordance with one embodiment of the present invention.

FIG. 1 illustrates a block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include information related to a broadcast channel, a broadcast program, or a broadcast service provider. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can include an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the previously described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. The wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi®, Wireless Broadband (WiBro®), World Interoperability for Microwave Access (WiMAX®), or High Speed Downlink Packet Access (HSDPA).

The short-range communication module 114 can be a module for supporting relatively short-range communications. For example, the short-range communication module 114 can be configured to communicate using short range communication technology, such as radio frequency identification (RFID), Infrared Data Association (IrDA), or Ultra-wideband (UWB), as well as networking technologies, such as Bluetooth® or ZigBee®.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can receive and process image frames of still images or video obtained by an image sensor of the camera 121 in a video call mode or a photographing mode. The processed image frames can be displayed on a display unit 151.

The image frames processed by the camera 121 can be stored in the memory 160 or can be transmitted to an external device via the wireless communication unit 110. Other embodiments of the mobile terminal 100 can include more than one camera 121.

The microphone 122 can receive an external audio signal while the mobile terminal 100 is operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply unit 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information associated with the mobile terminal 100.

For example, when the mobile terminal 100 is in a call mode, the display unit 151 can display a user interface (UI) or a graphic user interface (GUI) including information associated with placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display can be a transparent type or an optical transmissive type, such that the display unit 151 is implemented as a transparent display. For example, the transparent display can include a transparent OLED (TOLED) display. The rear structure of the display unit 151 can also be of an optical transmissive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to identify a touched portion of the display unit 151.

The proximity sensor 141 of the sensing unit 140 can be located in an internal region of the mobile terminal 100 and either be enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor, and the proximity sensor 141 can have greater utility than a contact sensor.

The proximity sensor 141 can include a transmissive photo-electric sensor, a direct reflective photo-electric sensor, a mirror reflective photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

A proximity touch and a proximity touch pattern can be detected via the proximity sensor 141, such as a proximity touch distance, a proximity touch duration, a proximity touch position, or a proximity touch movement state. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100 using vibration as well as video or audio signals. Events that may be indicated are a call received event, a message received event and a touch input received event. The video or audio signals can also be output via the display unit 151 or the audio output module 152. Therefore, in various embodiments, the display unit 151 or the audio output module 152 can be considered part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, an image producing element (not shown) for producing an image to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of the image producing element used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, the various types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identity module (UIM), a subscriber identity module (SIM) or a universal subscriber identity module (USIM). A device including the identity module (hereinafter referred to as an "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 can serve as a conduit to allow power from the cradle to be supplied to the mobile terminal 100, or can serve as a conduit to allow various command signals input by the user via the external cradle to be transmitted to the mobile terminal 100. Various command signals or power provided by the external cradle can be used as signals for recognizing that the mobile terminal 100 is properly loaded in the external cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The controller 180 can include a multimedia module 181 for playing multimedia. The multimedia module 181 can be integrated into the controller 180 as shown in FIG. 1, or can be external to the controller 180.

The power supply unit 190 can be an external power source, an internal power source, or a combination thereof. The power supply unit 190 can supply power to other components in the mobile terminal 100.

Various embodiments described herein can be implemented via a computer-readable medium using, for example, computer software, hardware, or a combination thereof. For example, the components of the mobile terminal 100 described herein can be implemented in hardware using at least application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, and/or combinations thereof. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2:
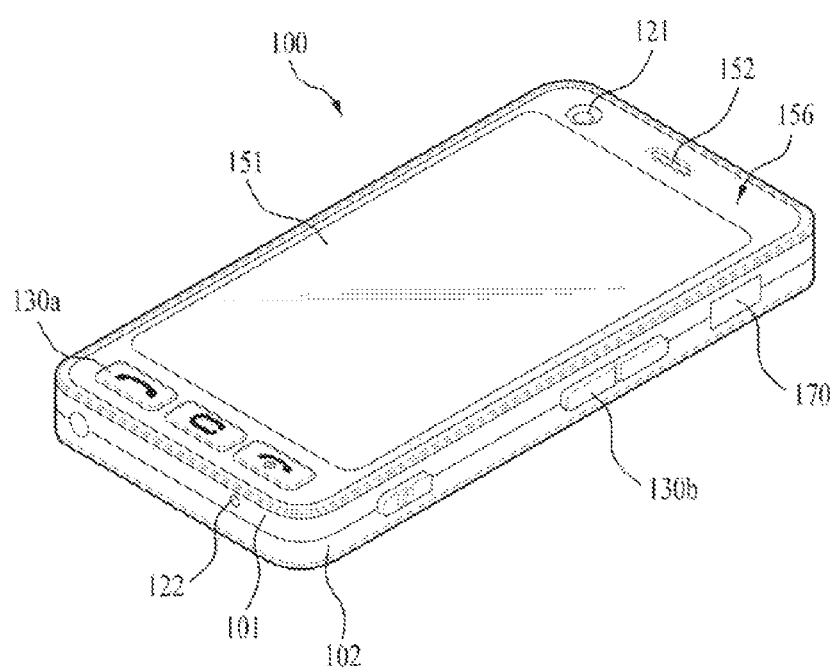
FIG. 2 is a front perspective view of a mobile terminal in accordance with one embodiment of the present invention.

FIG. 2 is a front perspective view of the mobile terminal 100 in accordance with one embodiment of the present invention. In FIG. 2, the mobile terminal 100 is shown to have a bar type terminal body.

It should be understood, however, that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2, for example, the display unit 151 can be configured to occupy a substantial portion of the front face 156 of the front case 101. As also shown in FIG. 2, the audio output module 152 and the camera 121 can be arranged in proximity to one end of the display unit 151, and the user input module 130a and the microphone 122 can be located in proximity to another end of the display unit 151. As further shown in FIG. 2, the user input module 130b and the interface unit 170 are arranged on the sides of the front case 101 and the rear case 102.

The user input unit 130 described previously with respect to FIG. 1 can be configured to receive a command for controlling an operation of the mobile terminal 100 and can include one or more of the user input modules 130a and 130b shown in FIG. 2. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured to allow a user to input commands such as "start," "end," and "scroll" to the mobile terminal 100. The user input module 130b can allow a user to input a command for adjusting the volume of the audio output module 152 or a command for switching to a touch recognition mode of the display unit 151.

Figure 3:
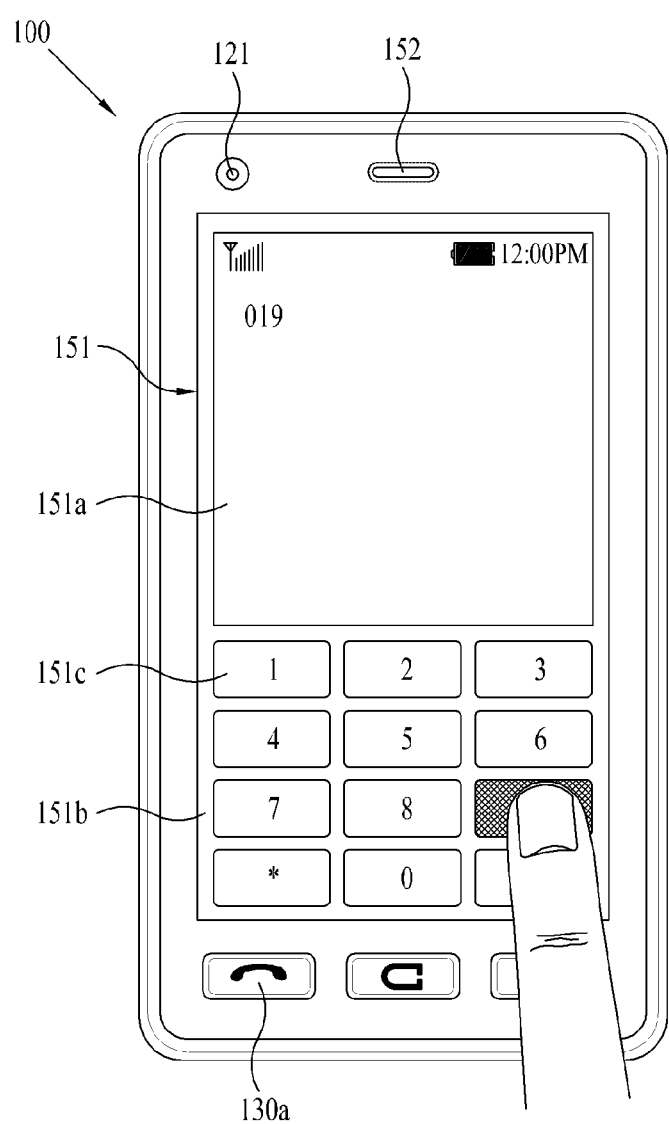
FIG. 3 is a front-view of a mobile terminal according to various embodiments of the present invention.

FIG. 3 is a front-view of mobile terminal 100 according to various embodiments of the present invention. Various kinds of visual information can be displayed on the display unit 151, such as characters, numerals, symbols, graphics, and icons. In order to input information, at least one of the characters, numerals, symbols, graphics and icons are represented as a single predetermined array to be implemented in a keypad formation on the display unit 151. This keypad formation is also referred to as "soft keys."

FIG. 3 shows a touch input applied to a soft key via a front face of a terminal body. The display unit 151 is operable through an entire area of the display unit 151 or by a number of divided regions on the display unit 151. In the latter case, the number of divided regions can be interoperable with each other.

For example, an output window 151a and an input window 151b are displayed on the display unit 151. A soft key 151c representing a digit for inputting a phone number or other data is displayed in the input window 151b. If the soft key 151c is touched, a digit corresponding to the touched soft key is displayed in the output window 151a. If the user input module 130a is manipulated, a call connection for the phone number displayed in the output window 151a is attempted.

Additionally, the display unit 151 may be configured to receive a touch input by scroll. A user scrolls the display unit 151 to shift a cursor or pointer located at an entity, such as an icon, displayed on the display unit 151. When a finger is shifted on the display unit 151, a path of the shifted finger can be visually displayed on the display unit 151. This may be useful when editing an image displayed on the display unit 151.

In one embodiment, the mobile terminal 100 can be configured as a dedicated e-book terminal, such that the main function of the mobile terminal 100 is to display e-books. Alternatively, the mobile terminal 100 can be configured to perform a number of various functions in addition to displaying an e-book via an application.

In one embodiment, e-book information can be shared with a number of users. For example, the e-book information can include a list of e-books retained by each user and information set on each e-book, such as a highlight, bookmark, or memo. The e-book information can be shared wirelessly via the wireless communication unit 110 or by a wired interface, such as the interface unit 170. Moreover, the e-book information can be shared periodically or in real-time. Alternatively, the e-book information can be shared each time a user command is received.

When a list of e-books retained by a user of the mobile terminal 100 is displayed on the touch screen 151, an icon corresponding to each of the e-books can be configured to appear on a bookshelf. The e-books retained by the user of the mobile terminal 100 refer to e-books stored as files in the memory 160 and conceptual e-books, the content of which can be instantly retrieved online by accessing an external device, Website, or server via the wireless communication unit 110. The e-books can be retained according to a "mobile terminal device specific" setting or a "user account specific" setting that is independent of the specific device used.

With respect to the "user account specific" setting, e-book information that is associated with a corresponding user is stored in an external server or a Website. For example, the e-book information can include a purchase list and/or a download list. Therefore, even if the mobile terminal 100 is replaced with a different mobile terminal, the e-book information associated with the corresponding user account stored in a server can be downloaded to the different mobile terminal when the same user account is used.

Figure 4A:
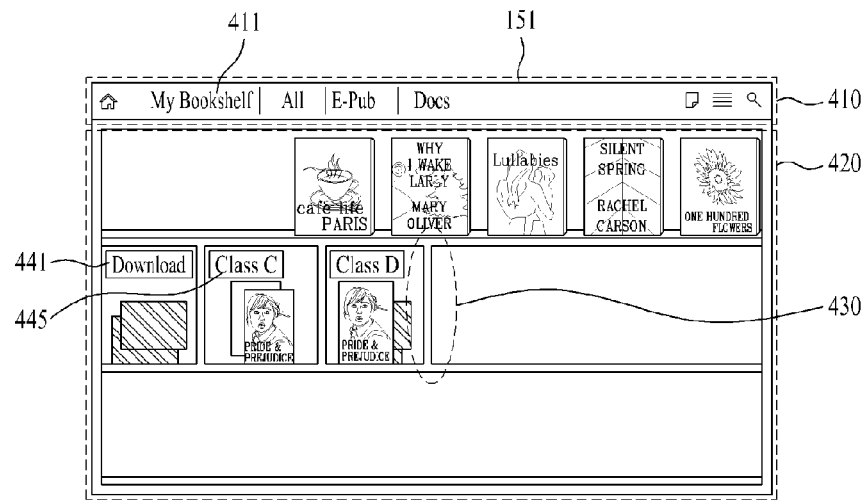
FIGS. 4A and 4B are display screens of a touch screen for displaying a list of e-books in a mobile terminal in accordance with one embodiment of the present invention.
Figure 4B:
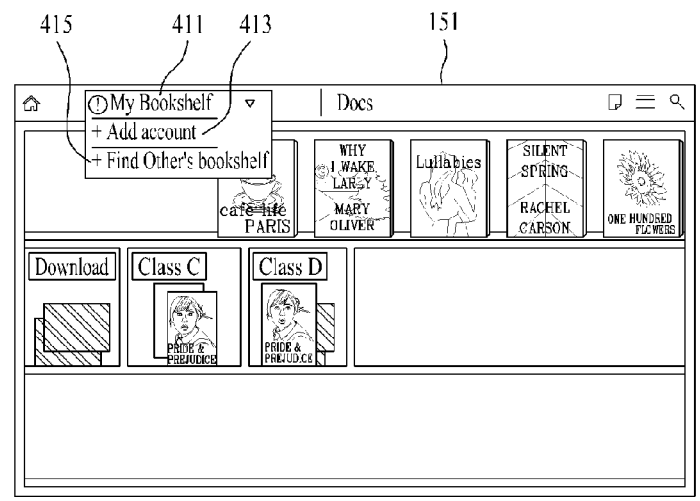

FIGS. 4A and 4B are display screens of the touch screen 151 for displaying a list of e-books in the mobile terminal 100 in accordance with one embodiment of the present invention. In FIG. 4A, e-books retained by a user of the mobile terminal 100 are displayed in an e-book list and e-book information of a different user of another mobile terminal is not shared. Furthermore, e-book information is set according to a user account belonging to the user of the mobile terminal 100.

As shown in FIG. 4A, an e-book list can be displayed as a number of book-shaped e-book icons arranged on a bookshelf. The e-book list can be displayed on the bookshelf as an initial screen when an e-book reading application is initiated. The e-book list can be displayed on the bookshelf in response to a selection of an icon for displaying the e-book list while an e-book is being read.

The e-book list can be displayed on the bookshelf by manipulating a prescribed menu. For example, when an e-book reading application is executed and a menu item, such as "my bookshelf" 411, is selected from a menu region 410 in an upper region of the touch screen 151, an e-book list 420 can then be displayed on the bookshelf in a lower region of the touch screen 151

For clarity and convenience in the following description, the term "bookshelf" will hereinafter refer to a bookshelf including an e-book list. Each e-book icon arranged on the bookshelf can correspond to a copy of an e-book in the e-book list. An e-book reading mode of the mobile terminal 100 can be executed when a prescribed one of the e-book icons is selected and an e-book matching the selected e-book icon can be displayed.

Categories of the e-books of the user can be sorted in accordance with a preset reference. Tags 441 and 445 indicating respective categories can be displayed above the corresponding e-book icons. A partition 430 can be displayed on a boundary to identify a category or a region for displaying an e-book of a different user of another mobile terminal on a bookshelf.

In one embodiment, a bookshelf of a different user of another mobile terminal can be viewed using the mobile terminal 100 by directly inputting or searching for information identifying the different user, such as account information or a phone number. Information from the bookshelf of the different user can be imported to the bookshelf of the user of the mobile terminal 100, as shown in the menu configuration of FIG. 4B.

With reference to FIG. 4B, when the menu item "My Bookshelf" 411 is selected while the bookshelf of the user of the mobile terminal 100 is displayed, a menu item "Add account" 413 and a menu item "Find other's bookshelf" 415 can be displayed. The menu items "add account" 413 and "find other's bookshelf" 415 can be executed in association with the menu item "My Bookshelf" 411.

When the menu item "Add account" 413 is selected, the user of the mobile terminal 100 can add an account of a different user of another mobile terminal by inputting information identifying the different user, such as a phone number, an e-mail address, or an account related to an e-book application. The menu item "Add account" 413 is conceptually similar to adding an account of a friend in an instant messenger service or a social network service (SNS).

Figure 5:
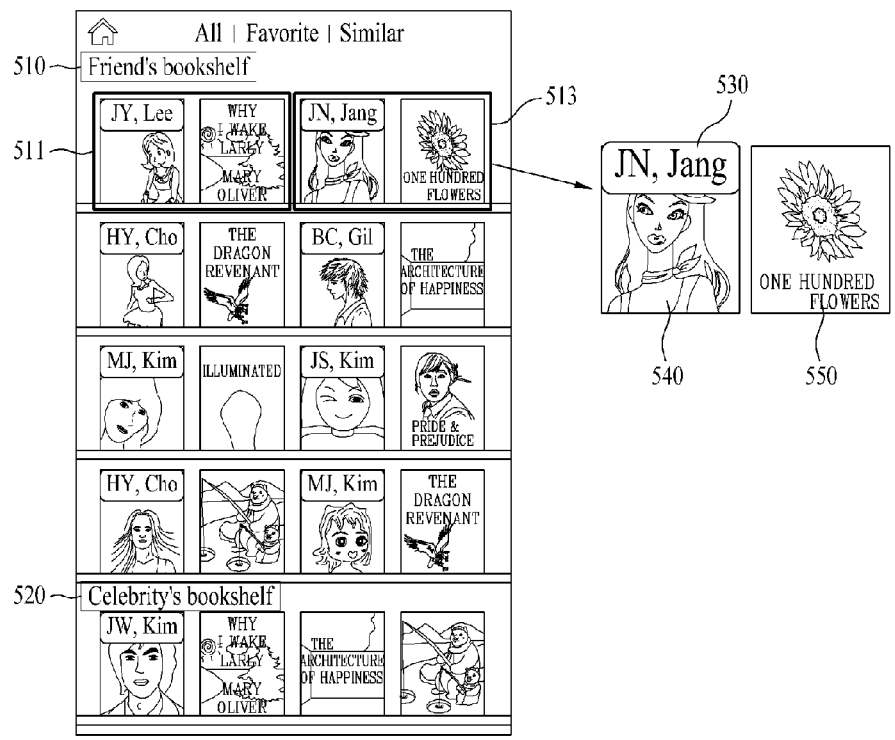
FIG. 5 is a display screen of a touch screen for displaying e-book information of different users that have subscribed to the account of the user of a mobile terminal in accordance with one embodiment of the present invention.

After an account of a different user has been added, e-book information of the different user who has subscribed to the account of the user of the mobile terminal 100 can be displayed in a prescribed form when the menu item "Find other's bookshelf" 415 is selected, as described with respect to FIG. 5. FIG. 5 is a display screen of the touch screen 151 for displaying e-book information of different users that have subscribed to the account of the user of the mobile terminal 100 in accordance with one embodiment of the present invention.

In the following description and accompanying drawings, the term "friend" is used to refer to the name of an account that is to be added to an account of the user of the mobile terminal 100. The term "friend" is further used to refer to a different user of another mobile terminal who has been added or to refer to an account of the different user that has been added. Moreover, the term "friend list" is used to refer to a list that includes e-book information of friends, as shown in FIG. 5.

Referring to FIG. 5, e-book information of friends are enumerated at an upper portion of the touch screen 151 and below a friend indicator 510 labeled "Friend's bookshelf." The e-book information of a prescribed friend 513 can include a user name 530, a photo 540 and a representative e-book icon 550. The user name 530 can be a real name, a nickname set in association with an account, or an account identification (ID). The photo 540 can serve as a main image of a homepage and is not required to include a photo of the user of the corresponding account. The e-book icon 550 can include an e-book icon of a recently purchased e-book, an e-book icon of a currently read e-book or an e-book icon randomly set by the user of the corresponding account.

Accounts of others, such as celebrities, provided by a Web server can be displayed in a celebrity list below a celebrity indicator 520 at a lower portion of the touch screen 151. The accounts of others can be displayed concurrently with the accounts of friends subscribing to the account of the user of the mobile terminal 100.

When a prescribed account is selected from among the friends in the friend list or celebrities in the celebrity list, a bookshelf set for the corresponding account can be displayed on the touch screen 151. The manner in which a bookshelf of a friend's account is displayed is described with reference to FIG. 6.

Figure 6:
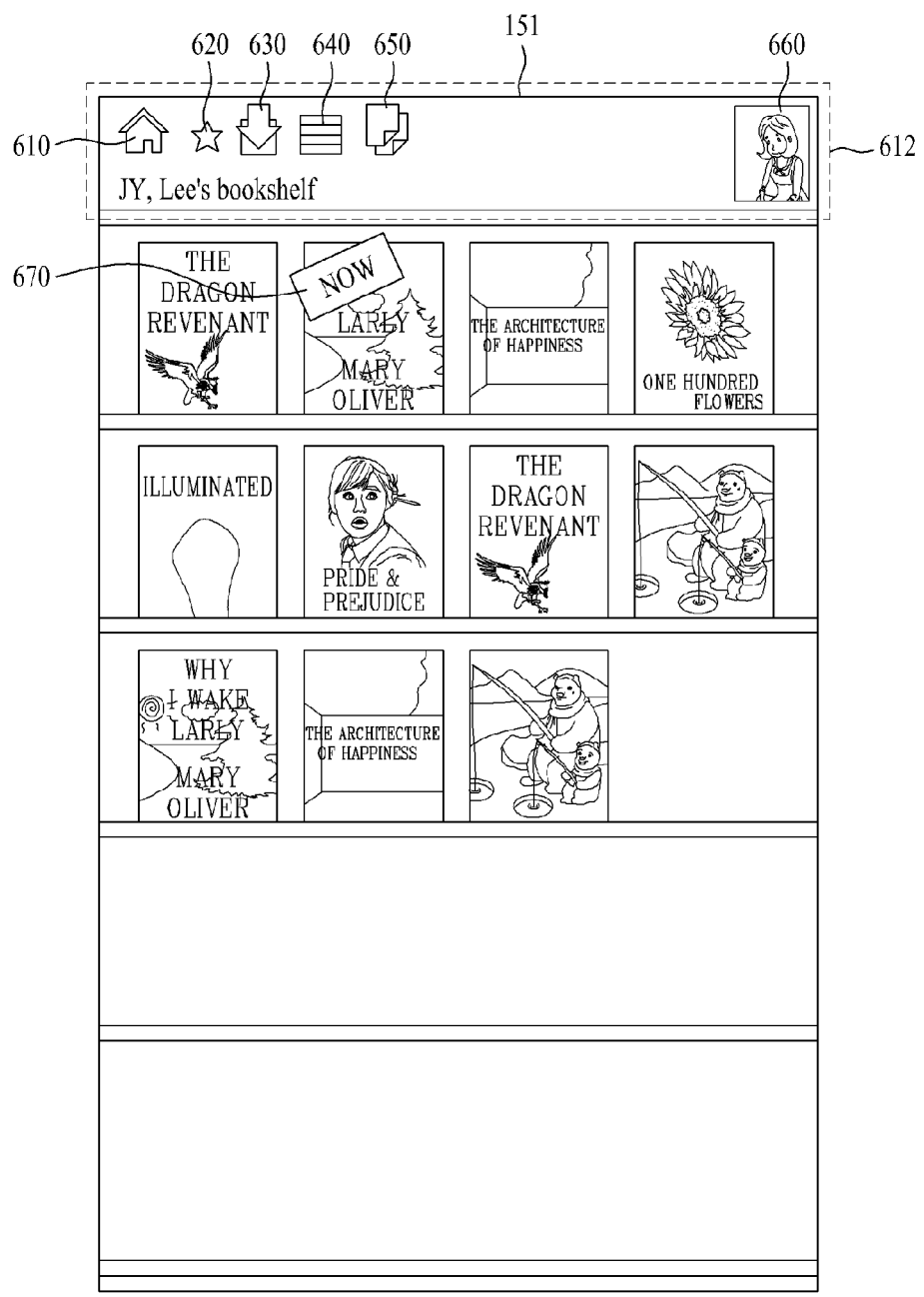
FIG. 6 is a display screen of a touch screen for displaying a bookshelf of a friend on a mobile terminal in accordance with one embodiment of the present invention.

FIG. 6 is a display screen of the touch screen 151 for displaying a bookshelf of a friend on the mobile terminal 100 in accordance with one embodiment of the present invention. After a friend is selected from the friend list, such as the friend "JY, Lee" 511 shown in FIG. 5, information regarding the selected friend and icons corresponding to functions that can be executed on the bookshelf of the selected friend are displayed in the bar 612 at a top portion of the touch screen 151, as shown in FIG. 6. In addition, the selected friend's bookshelf that includes e-book icons of the e-books retained by the selected friend are displayed at a lower region of the touch screen 151.

The bar 612 can include a home icon 610 for returning to the bookshelf of the user of the mobile terminal 100, a bookmark icon 620 for adding a bookmark linked to a friend's bookshelf, an import icon 630 for importing an e-book retained by a friend into the bookshelf of the user of the mobile terminal 100, a bookmark view icon 640 for viewing a bookmark set by a friend, and a memo and highlight icon 650 for viewing a memo and highlight set by a friend.

As shown in FIG. 6, the bar 612 can further include a photo 660 set by the friend, in addition to a name and account ID of the friend. As further shown in FIG. 6, an indicator 670 indicating an e-book currently being read by the friend can be displayed on the bookshelf.

Figure 7:
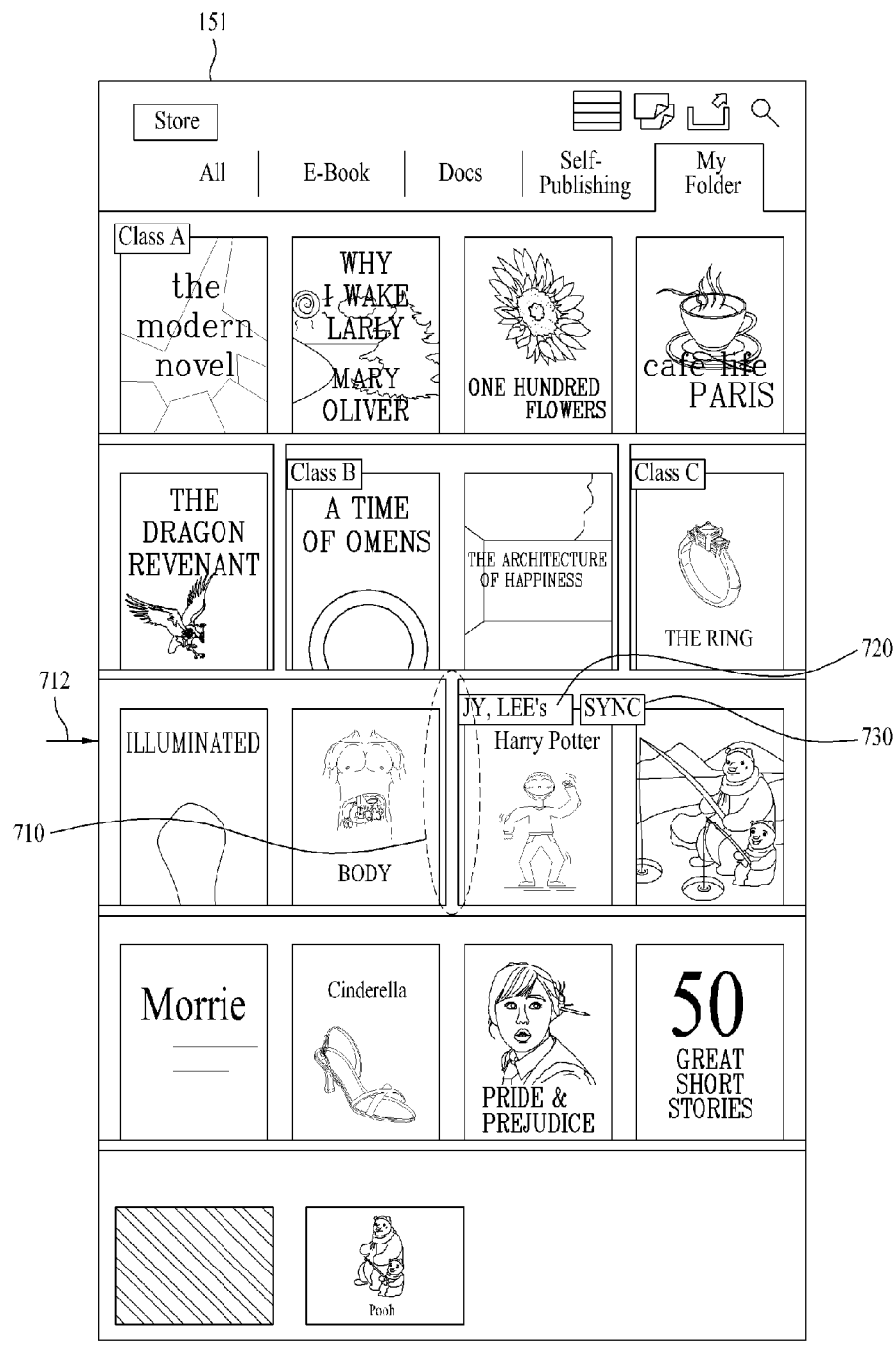
FIG. 7 is a display screen of a touch screen that demonstrates the sharing of e-book information of a friend with a user of a mobile terminal in accordance with one embodiment of the present invention.

E-book information of a friend, which can include the bookshelf of the friend, can be transmitted to the mobile terminal 100 when the import icon 630 is selected. In particular, an e-book retained by the friend can be moved to the bookshelf of the user of the mobile terminal 100, as described with reference to FIG. 7. FIG. 7 is a display screen of the touch screen 151 that demonstrates the sharing of e-book information of a friend with a user of the mobile terminal 100 in accordance with one embodiment of the present invention.

In the embodiment of FIG. 7, a total of ten e-book icons of the user of the mobile terminal 100 are arranged on a bookshelf that includes five shelves, such that a partition 710 is displayed on the third shelf 712 to distinguish a region in which the e-book icons corresponding to e-books retained by the user of the mobile terminal 100 are located. As a friend's e-book information is shared with the user of the mobile terminal 100, e-book icons corresponding to e-books retained by the friend are displayed on the right side and below the partition 710 as shown in FIG. 7.

As further shown in FIG. 7, a friend name tag 720 indicating that a particular e-book belongs to a prescribed friend and a synchronization icon 730 for synchronization can also be displayed on the touch screen 151. When the friend name tag 720 is selected, a shortcut to the bookshelf of the corresponding friend can be executed. When the synchronization icon 730 is selected, the e-book information of the friend can be updated by importing the e-book information of the friend. After the e-book information of the friend has been imported, the corresponding friend may purchase a new e-book. In such a case, an e-book icon corresponding to the newly purchased e-book can be added to the bookshelf of the user of the mobile terminal 100 when the e-book information is updated.

In one embodiment, when e-book information of a friend is imported, e-book icons of the friend can be displayed directly on the bookshelf of the user of the mobile terminal 100. In another embodiment, only a shortcut to an e-book of the friend is generated. In such a case, an e-book icon is displayed on the bookshelf of the user of the mobile terminal 100 only when an input for importing a corresponding e-book is received, as described with reference to FIG. 8.

FIG. 8 is a display screen of the touch screen 151 demonstrating sharing of e-book information of a friend with a user of the mobile terminal 100 in accordance with one embodiment of the present invention. As shown in FIG. 8, a bookshelf of the user of the mobile terminal 100 is displayed in a landscape mode on the touch screen 151 in accordance with one embodiment of the invention. The bookshelf of the user of the mobile terminal 100 includes three shelves, such as top shelf 812, middle shelf 814, and bottom shelf 816.

In the embodiment of FIG. 8, e-books retained by the user of the mobile terminal 100 are displayed on the top shelf 812.

Also in the embodiment of FIG. 8, five friends are added and displayed on the middle shelf 814, such that the five friends are separated from each other via partitions. As shown in FIG. 8, representative photos and synchronization icons 830 of three of the friends are displayed in the region 820 on the right side of the middle shelf 814.

When one of the representative photos of the friends is selected, a shortcut function to a bookshelf of the selected friend can be executed. When the synchronization icon 830 is selected, e-book icons of the e-books retained by the corresponding friend can be displayed in an overlapping manner, as shown in the e-book icons in region 810. When a friend is initially added, only a shortcut function to a bookshelf of the added friend is implemented on the bookshelf of the user of the mobile terminal 100. E-book information of the corresponding friend can be imported to the mobile terminal 100 only if the synchronization icon is selected.

In one embodiment, the same e-book may be retained by both a user of the mobile terminal 100 and a friend. In such a case, when e-book information of the friend is imported to a bookshelf of the user of the mobile terminal 100, a duplicate of the same e-book icon may be displayed on the bookshelf of the user of the mobile terminal 100 resulting in wasted bookshelf space. Therefore, the mobile terminal 100 can be configured to display the same e-book icon only in a region of the bookshelf that includes e-book icons of the user of the mobile terminal 100, as described with reference to FIGS. 9A through 9C.

Figure 9A:
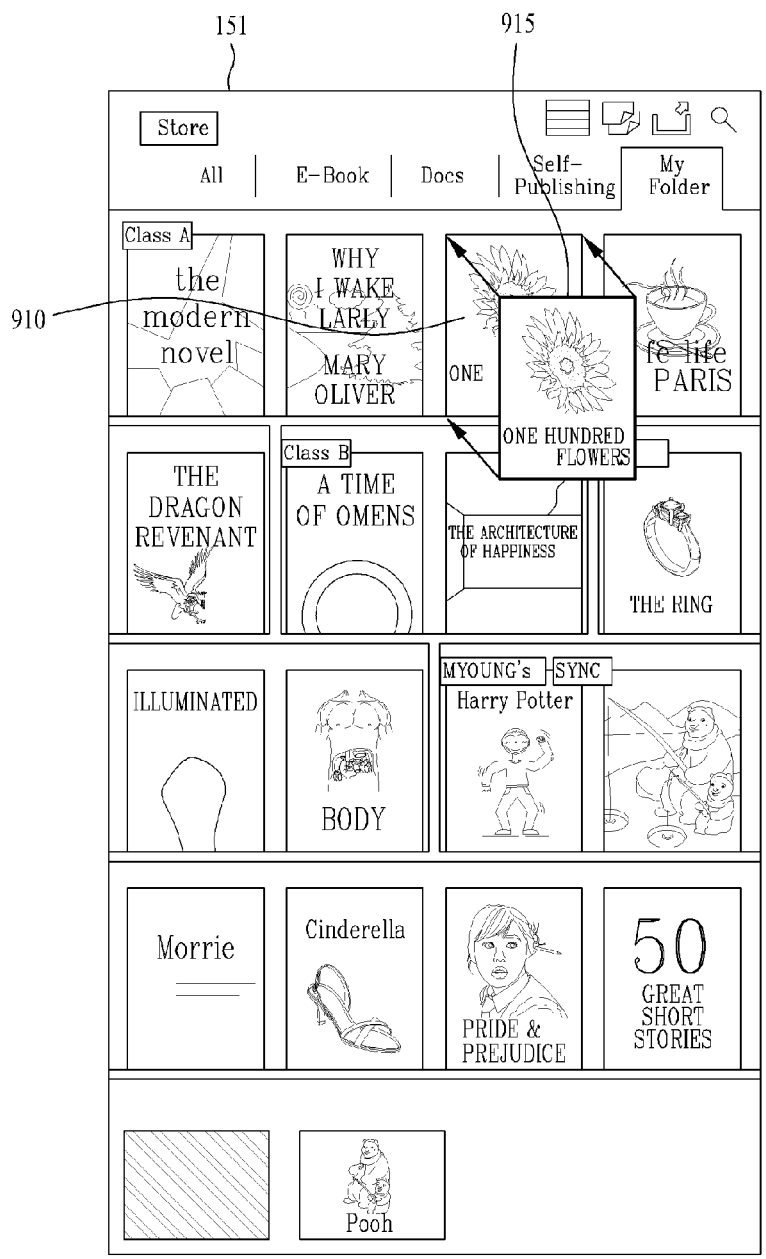
FIGS. 9A through 9C are display screens of a touch screen for displaying an e-book icon on the bookshelf of the user of a mobile terminal when the same e-book exists in e-book information of a friend in accordance with one embodiment of the present invention.
Figure 9B:
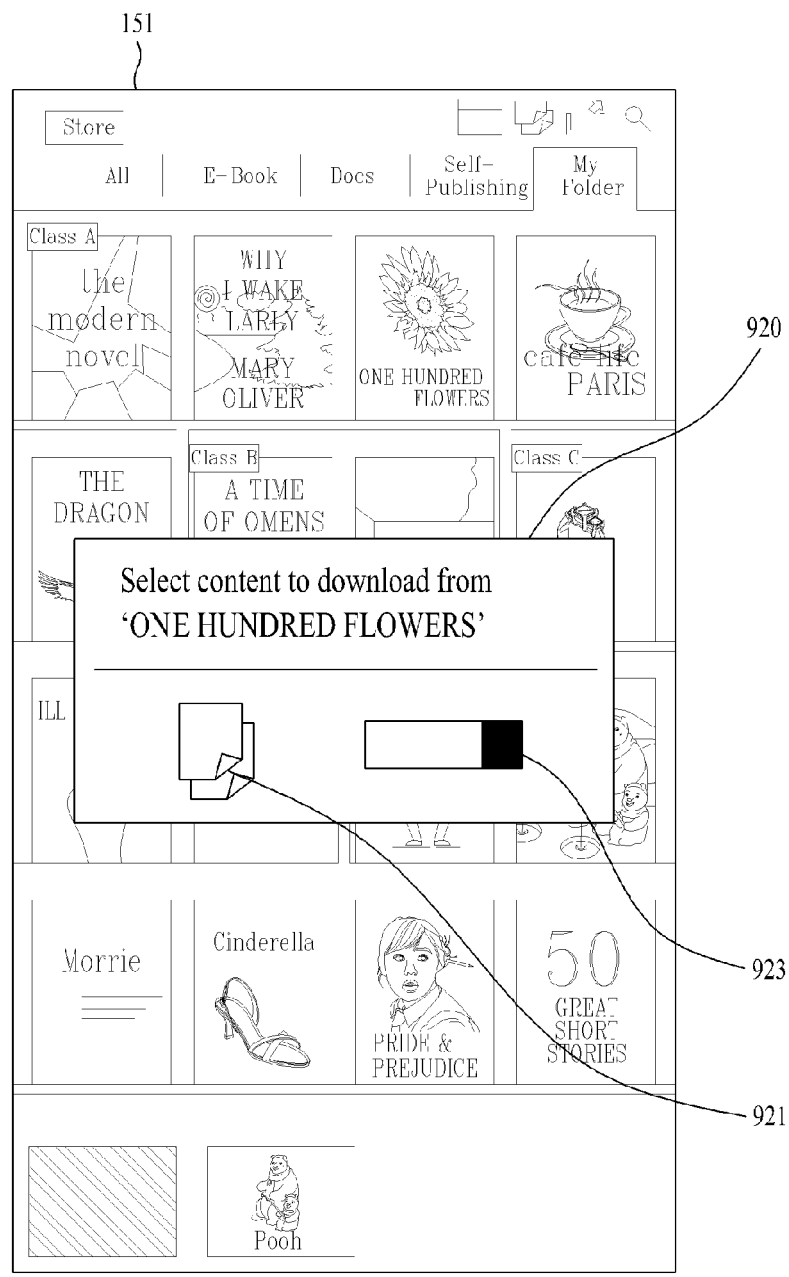
Figure 9C:
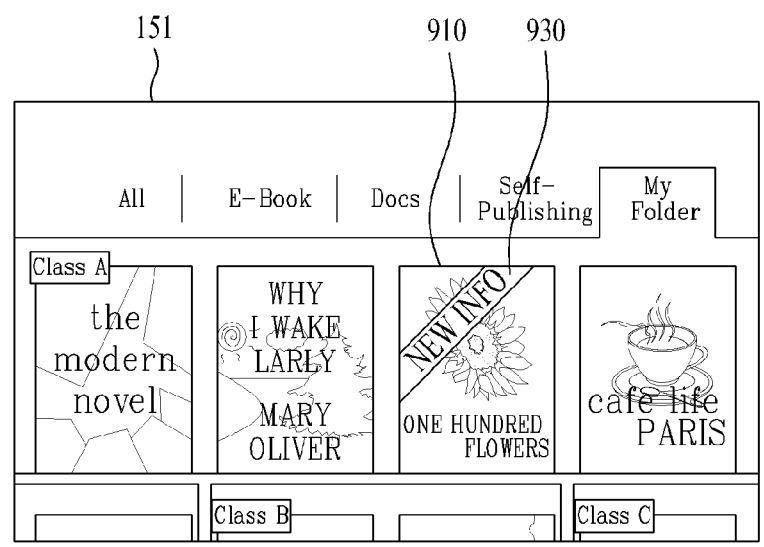

FIGS. 9A through 9C are display screens of the touch screen 151 for displaying an e-book icon on the bookshelf of the user of the mobile terminal 100 when the same e-book exists in e-book information of a friend in accordance with one embodiment of the present invention. As shown in FIG. 9A, when e-book information of a friend is imported to a bookshelf of the user of the mobile terminal 100 and when an e-book icon 915 existing in the e-book information of the friend and an e-book icon 910 on the bookshelf of the user of the mobile terminal 100 represent the same e-book, then the e-book icon 915 can be displayed by applying a visual effect such that the e-book icon 915 appears to overlap the e-book icon 910 in a region above the e-book icon 910.

Referring to FIG. 9B, a selection can then be made as to whether prescribed information set by the friend on the same e-book will be received by the mobile terminal 100. In one embodiment, the user of the mobile terminal 100 can select a memo and highlight and/or a bookmark set by the friend on the same e-book by selecting a memo and highlight menu 921 and/or a bookmark menu 923 displayed on a pop-up window 920.

After the selection is made, an indicator 930 indicating that the e-book on the bookshelf of the user of the mobile terminal 100 is the same as the e-book of the friend can be displayed on the e-book icon 910 in the region of the bookshelf where the e-book icons of the user of the mobile terminal 100 are displayed. It should be understood that the indicator 930 can be displayed using various shapes and colors based on the friend, the number of friends, or a presence or absence of bookmark, memo and highlight information.

The mobile terminal 100 can be configured to compile statistics using e-book information received from a number of friends. For example, a must-have function can be used to determine the order of the e-books retained by the mobile terminal 100 based on statistics, as shown in FIG. 10.

Figure 10:
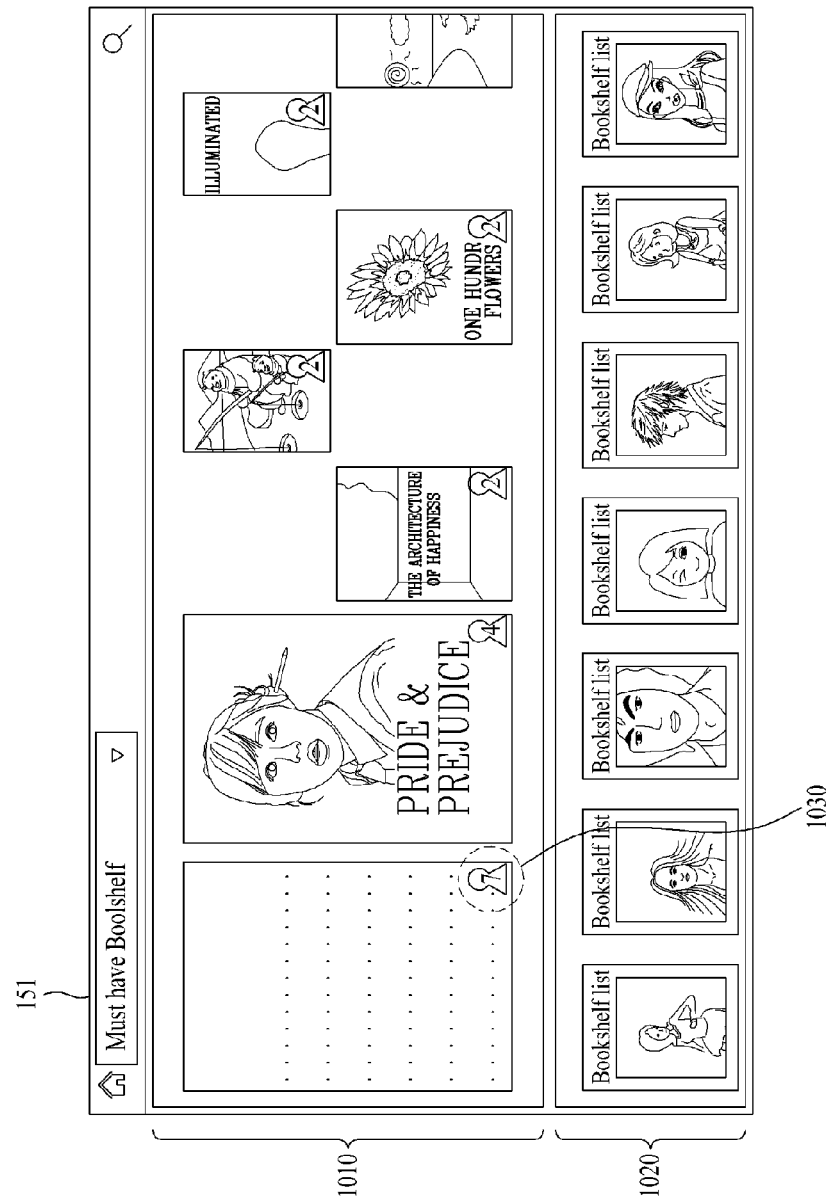
FIG. 10 is a display screen of a touch screen showing a specific order of e-books retained by a mobile terminal as determined by a statistical function using e-book information in accordance with one embodiment of the present invention.

FIG. 10 is a display screen of the touch screen 151 showing a specific order of e-books retained by the mobile terminal 100 as determined by a statistical function using e-book information in accordance with one embodiment of the present invention. Referring to FIG. 10, a must-have mode of the mobile terminal 100 can be displayed on the touch screen 151 when a must-have menu item 840 shown in FIG. 8 is selected. In one embodiment, the must-have mode can display an order of the e-books retained by friends added to the account of the user of the mobile terminal 100.

In the must-have mode, e-book icons of e-books can be sorted according to a reference, such as the count number of each of the e-books, and displayed in an upper region 1010 of the touch screen 151. A list of friends associated with the counted e-books is displayed in a lower region 1020 of the touch screen 151. The number of friends 1030 retaining the corresponding e-book or a value generated using the number of friends 1030 can be displayed on each of the e-book icons in the upper region 1010.

As previously discussed, the e-books retained by a friend can be displayed on a bookshelf of the user of the mobile terminal 100 when e-book information is imported from the friend. Although the above-mentioned embodiments are based on the assumption that all of the e-books retained by the friend are displayed on the bookshelf of the user of the mobile terminal 100, it should be understood that the mobile terminal 100 can be set to selectively import the e-books of the friend, as described with reference to FIG. 11.

Figure 11:
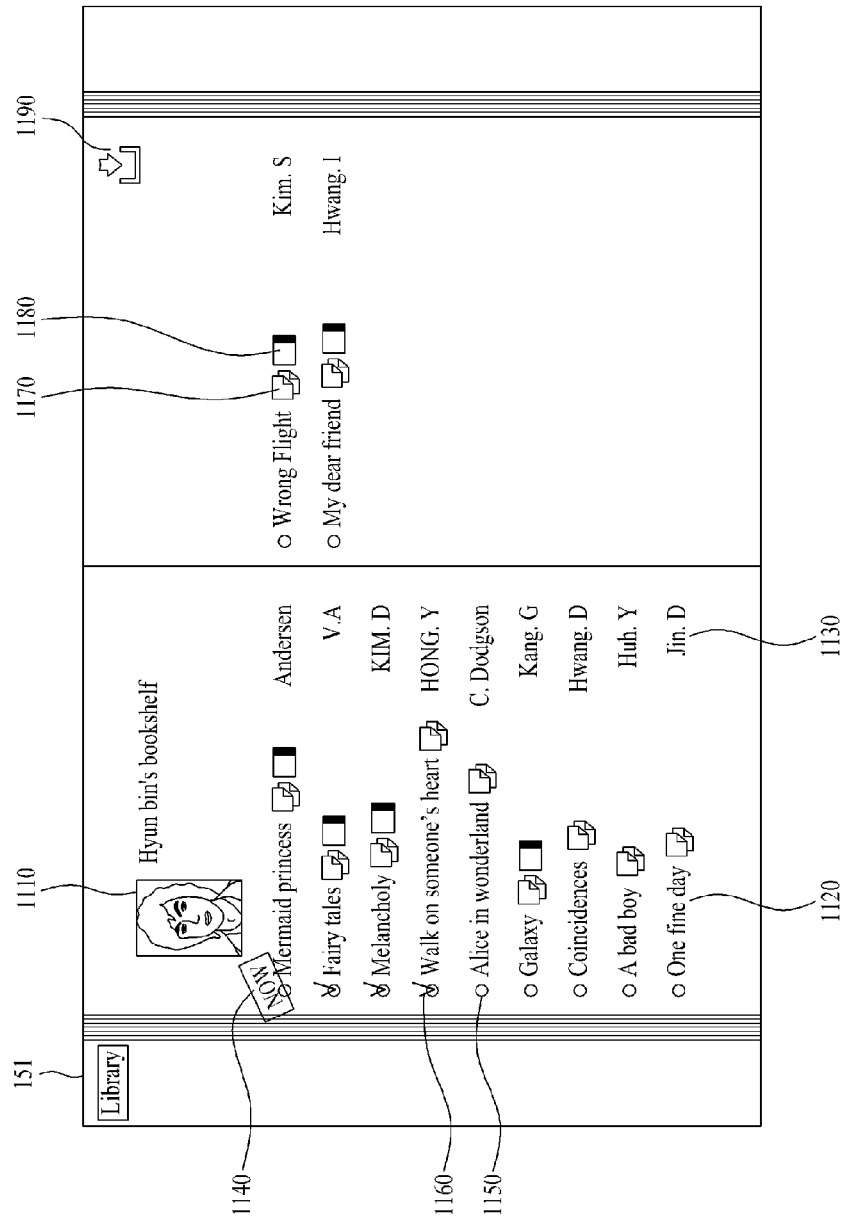
FIG. 11 is a display screen of a touch screen showing a selection menu for selectively receiving e-book information of a friend in a mobile terminal in accordance with one embodiment of the present invention.

FIG. 11 is a display screen of the touch screen 151 showing a selection menu for selectively receiving e-book information of a friend in the mobile terminal 100 in accordance with one embodiment of the present invention. In one embodiment, the display screen in FIG. 11 can be displayed when the import icon 630 is selected from the bookshelf shown in FIG. 6.

As shown in FIG. 11, friend information can be displayed on a selection menu. For example, the friend information can be a photo 1110 of a friend, a title 1120 of an e-book retained by the friend, an author 1130 of an e-book retained by the friend, an indicator 1140 indicating an e-book currently being read by the friend, a checkbox 1150 for determining whether to import a corresponding e-book to a bookshelf of the user of the mobile terminal 100. As further shown in FIG. 11, an icon 1170 indicating a presence of a memo and highlight set by the friend and an icon 1180 indicating a presence of a bookmark set by the friend can be further displayed adjacent to the title of each e-book.

A check icon 1160 can be displayed when the checkbox 1150 is selected to indicate a completed selection. The checkbox 1150 can be configured to toggle, such that the check icon 1160 can be displayed or no longer displayed each time the checkbox 1150 is selected.

After selection of a checkbox is completed, a user of the mobile terminal 100 can select the import icon 1190. Accordingly, e-books with selected checkboxes from among the number of the e-books retained by the friend can be displayed on the bookshelf of the user of the mobile terminal 100 when the import icon 1190 is selected.

The bookshelves and e-book icons arranged on the bookshelves in the previously described embodiments of FIG. 4A through FIG. 11 were described according to a front view. In one embodiment, a bookshelf and the e-book icons arranged on the bookshelf can be displayed by the mobile terminal 100 according to a perspective view to achieve a three dimensional appearance, as described with reference to FIG. 12.

Figure 12:
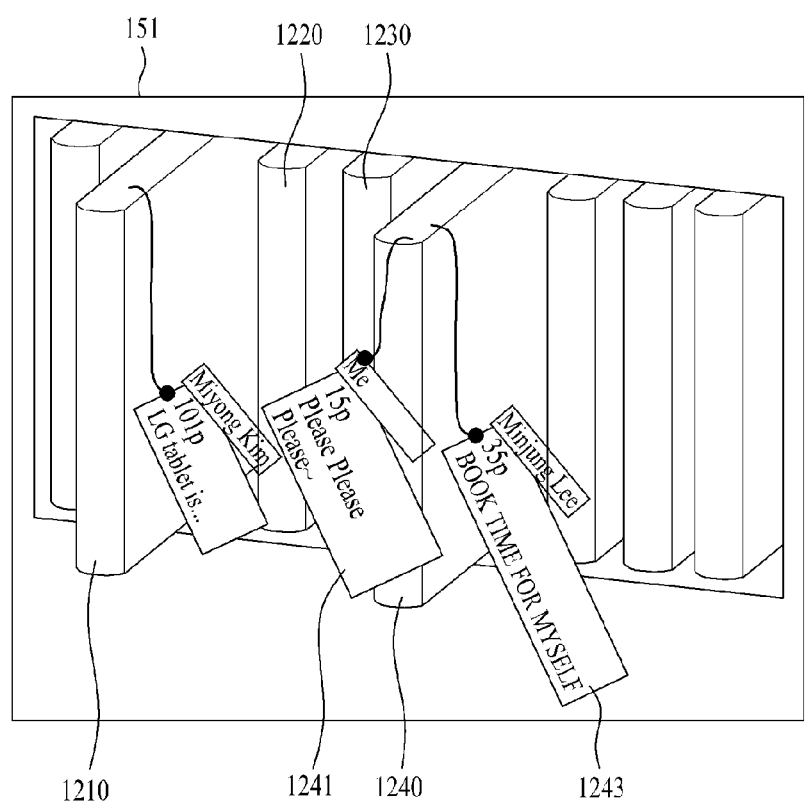
FIG. 12 is a display screen of a touch screen displaying a bookshelf and an e-book list in a three dimensional manner in accordance with one embodiment of the present invention.

FIG. 12 is a display screen of the touch screen 151 displaying a bookshelf and an e-book list in a three dimensional manner in accordance with one embodiment of the present invention. The front view and the perspective view can be switched via a prescribed menu manipulation or a touch input of a specific pattern. For example, the touch input of a specific pattern can be a multi-touch input, such that two fingers are simultaneously dragged in a prescribed direction.

Referring to FIG. 12, an e-book icon 1210 having a high reading frequency or an e-book icon 1240 of a recently read e-book can be displayed by protruding out further than other e-book icons 1220 and 1230. In one embodiment, the degree of protrusion of the e-book icon 1210 corresponds to the extent of the reading frequency.

When a bookmark or memo information set by either a user of the mobile terminal 100 or a friend exists in a corresponding e-book, an indicator 1241 or 1243 having a bookmark shape can be displayed on a corresponding e-book icon. Bookmark content and a name of either the user of the mobile terminal 100 or a friend can be displayed on each indicator.

The indicators 1241 and 1243 can be provided with a different color or pattern in accordance with an account or a type of the bookmark, memo or highlight. Moreover, bookmark, memo or highlight information set by a friend can be transferred to the mobile terminal 100 when bookmark information is imported.

The indicator 1241 corresponding to the bookmark set by the user of the mobile terminal 100 and the indicator 1243 corresponding to the bookmark set by the friend are displayed on the e-book icon 1240. Therefore, similar to the previously described embodiment of FIGS. 9A through 9C, the e-book icon 1240 corresponding to an e-book common to both the user of the mobile terminal 100 and a friend is displayed only in the region of the bookshelf that includes books retained by the user of the mobile terminal 100.

If indicators generated from at least two different accounts, such as an account of the user of the mobile terminal 100 and an account of at least one friend, are displayed for the same e-book, a bookmark collective view function can be executed when the indicators are set to overlap one another. In one embodiment where the mobile terminal 100 is configured to receive a multi-touch input, the indicators can be set to overlap one another by applying a touch input using one finger on one indicator and another finger on a different indicator. A clamping gesture is then performed by reducing the distance between the two touch input points.

In another embodiment where the mobile terminal 100 is not configured to receive a multi-touch input, the indicators can be overlapped by touching and dragging an indicator and then dropping the indicator on another indicator. The bookmark collective view function is described with reference to FIGS. 13A and 13B.

Figure 13A:
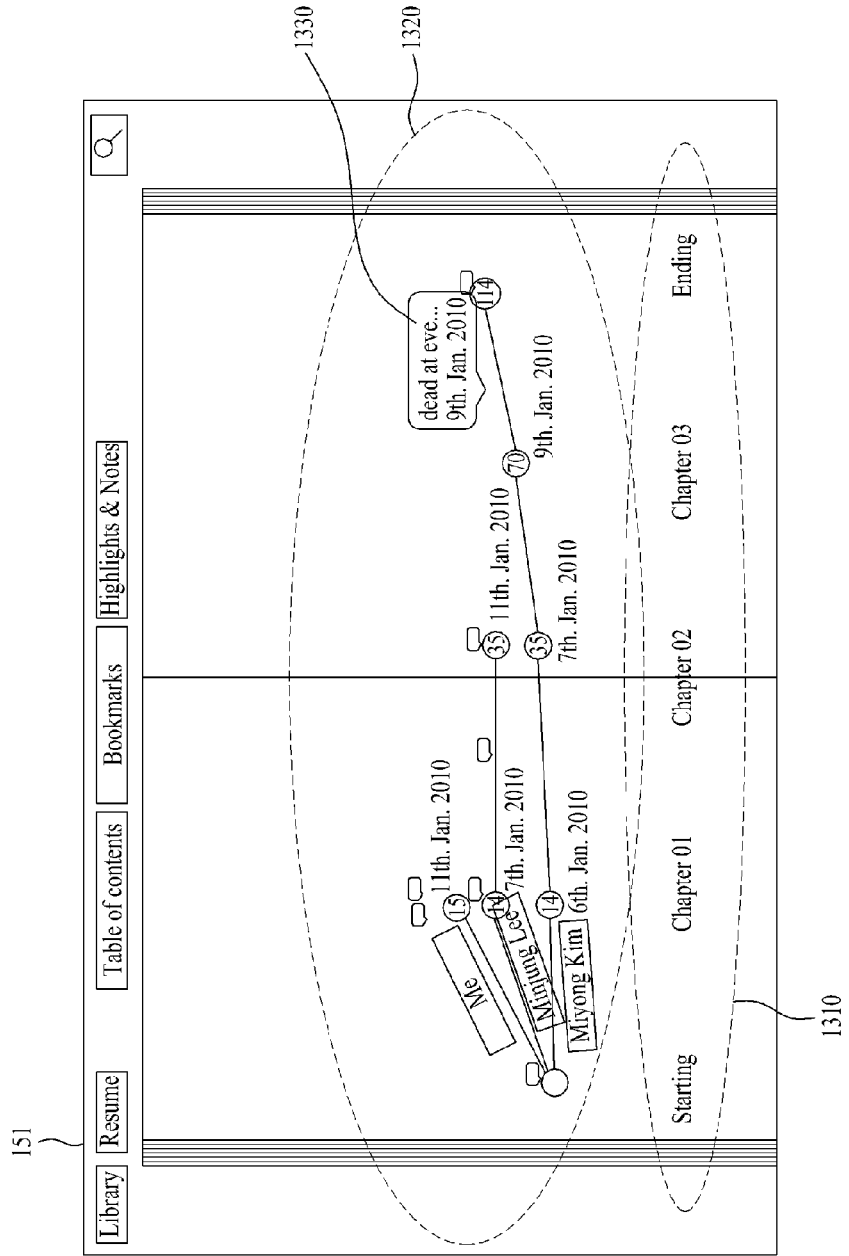
FIGS. 13A and 13B are display screens of a touch screen showing a bookmark collective view function in a mobile terminal in accordance with one embodiment of the present invention.
Figure 13B:
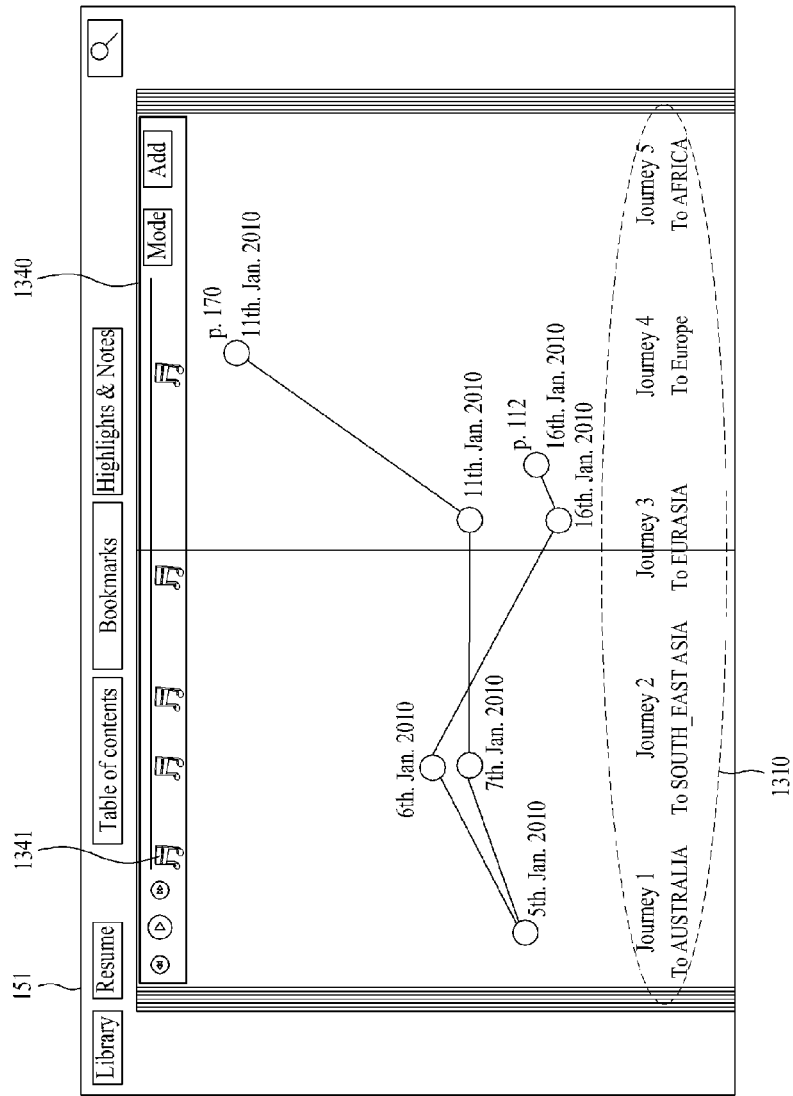

FIGS. 13A and 13B are display screens of the touch screen 151 showing a bookmark collective view function in the mobile terminal 100 in accordance with one embodiment of the present invention. In FIGS. 13A and 13B, it is assumed that information regarding the period of time an e-book is read is stored in a bookmark. In one embodiment, the information can include e-book reading progress over a period of time.

Referring to FIG. 13A, when the bookmark collective view function is executed as previously described with reference to FIG. 12, a table of contents 1310 of an e-book is displayed on a horizontal axis in a lower region of the touch screen 151. Moreover, reading progresses 1320 of each user reading the e-book are represented by line graphs above the table of contents 1310 in an upper region of the touch screen 151.

Each of the reading progresses 1320 can include a date on which each corresponding chapter of the e-book has been reached. A slope of a line in the line graphs can be configured to be proportional to reading speed. A memo indicator 1330 can be displayed on a corresponding line graph at the point in time when the memo was written, if a memo has been written by a user of the mobile terminal 100 or a friend.

In the embodiments of FIGS. 13A and 13B, the table of contents 1310 is displayed in a horizontal direction. In other embodiments, the table of contents 1310 can be displayed in a different direction than the horizontal direction.

In one embodiment, the table of contents provided by an e-book can be modified. Alternatively, the table of contents provided by an e-book can be displayed without modification to correspond to a line graph above the table of contents.

If music is played when a user of the mobile terminal 100 or a friend is reading an e-book, information identifying the music at a prescribed portion of the e-book can be stored and shared in bookmark information. A music bar 1340 is displayed in an upper region of the touch screen 151 and music indicators 1341 can be displayed at respective timing points. The music indicators 1341 are displayed as simple icons, as shown in FIG. 13B. Information regarding a song can be displayed when one of the music indicators 1341 is selected. Alternatively, the mobile terminal 100 can be configured to always display the song information on the corresponding music indicator.

The bookmark collective view function can be performed in accordance with a manipulation of the bookmark indicator displayed on the bookshelf in a perspective view. Alternatively, the bookmark indicator can be displayed on each of the e-book icons displayed on the bookshelf in a front view. The bookmark collective view function can also be performed via the displayed e-book icons.

As previously discussed, information regarding the author of an e-book and a title of the e-book can be included in e-book information imported from a friend. In one embodiment, the mobile terminal 100 can be configured to form an author tree by displaying a number of authors for each category or genre of an e-book, such that the names of the authors are arranged as leaves on a branch of a tree. For example, the category or genre of an e-book can include politics, economics, novels, hobbies, and education.

In one embodiment, an author can correspond to a single leaf and a category can correspond to a single branch. The category of an e-book can be set in the e-book in advance or randomly set by a user.

Figure 14A:
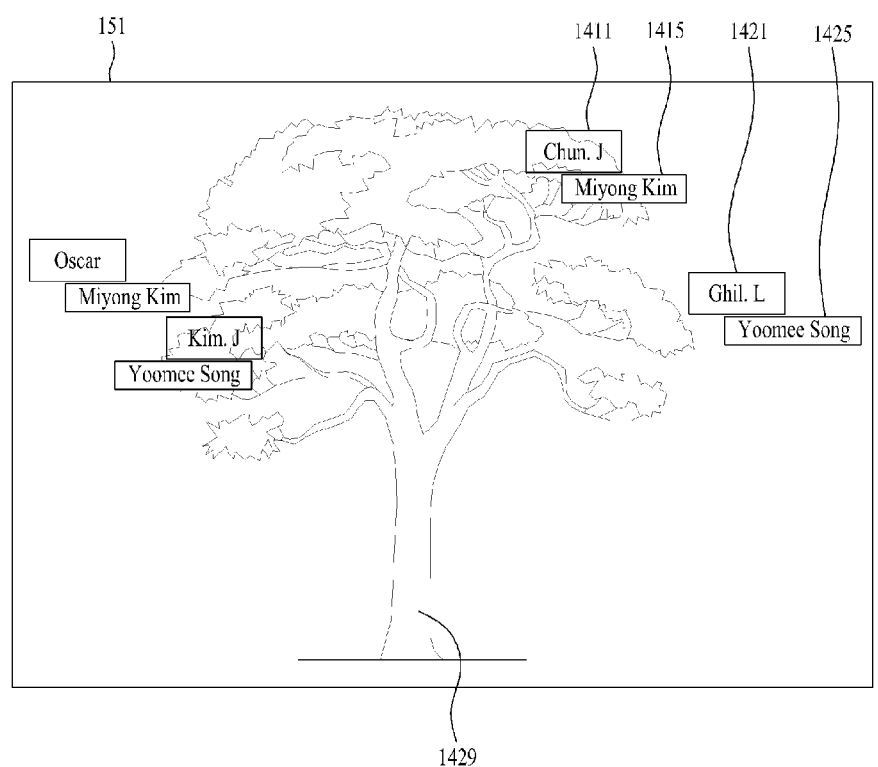
FIGS. 14A through 14C are display screens of a touch screen showing an author tree in accordance with one embodiment of the present invention.
Figure 14B:
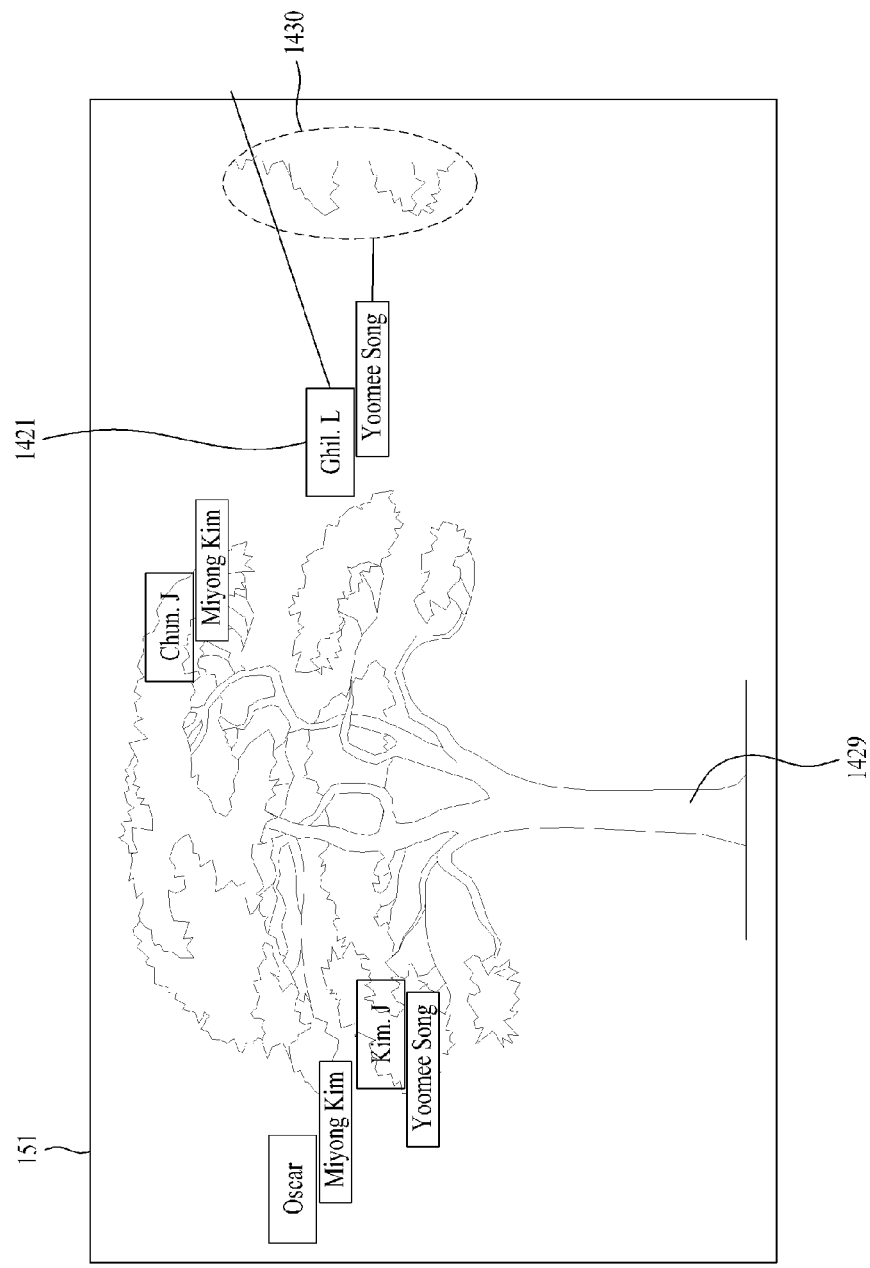
Figure 14C:
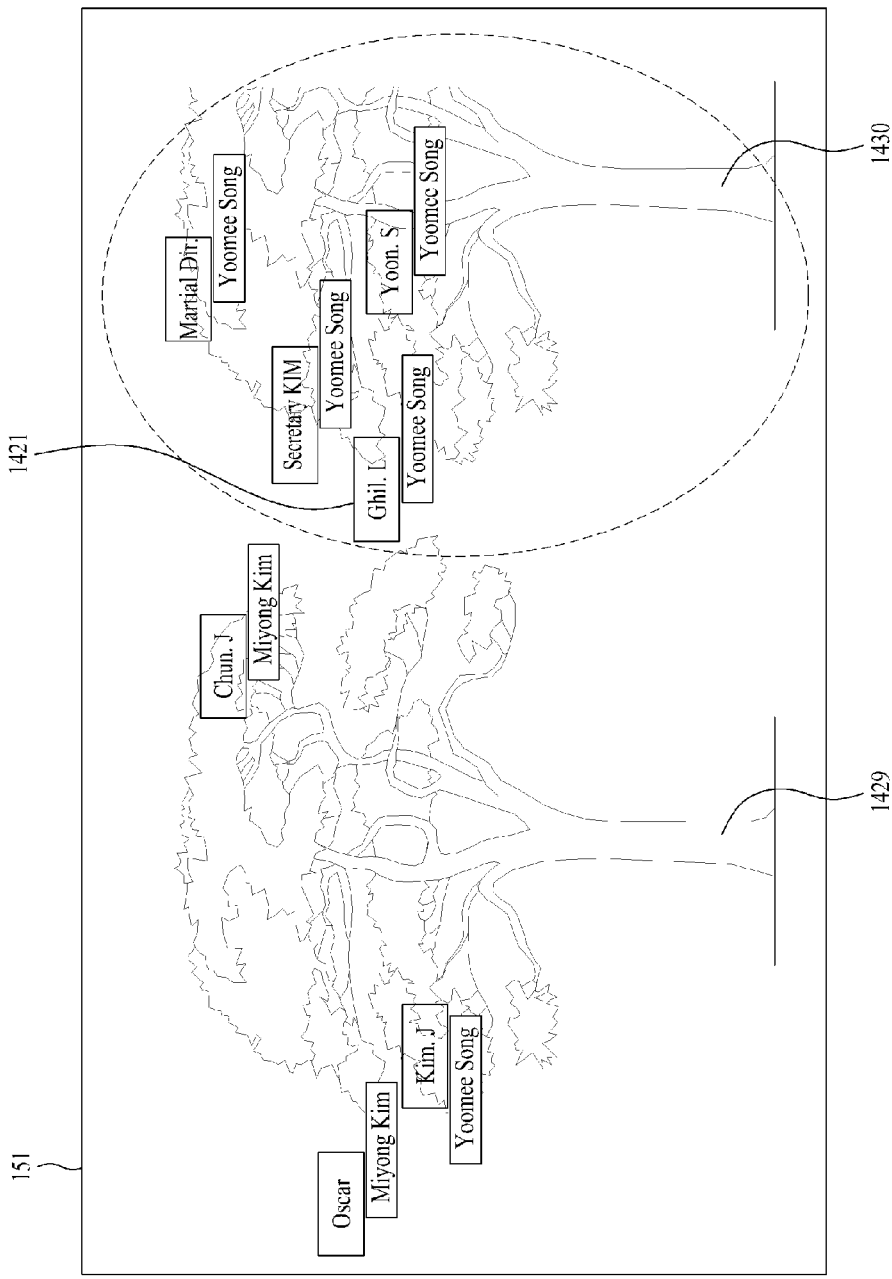

The number of leaves can be increased as the number of e-books or authors is increased to provide a tree with an abundance of leaves. This is described with reference to FIGS. 14A through 14C. FIGS. 14A through 14C are display screens of the touch screen 151 showing an author tree in accordance with one embodiment of the present invention.

In one embodiment, an author tree mode can be set to be automatically executed each time a user purchases a new e-book or imports a new e-book from a bookshelf of a friend. In another embodiment, the author tree mode can be displayed in accordance with a manipulation of a prescribed menu.

Referring to FIG. 14A, when authors 1411 and 1421 in the author tree 1429 set in the account of the user of the mobile terminal 100 are the same as authors included in author trees set by friends added to an account of the user of the mobile terminal 100, overlapping author indicators 1415 and 1425 can be displayed. Each of the overlapping author indicators 1415 and 1425 indicates that a corresponding author is included in an author tree of a prescribed one of the friends.

In one embodiment, categories can be sorted such that each author tree represents a single category. In such an embodiment, a number of author trees can exist for each category. An author may publish e-books that respectively belong to different categories. In such a case, with reference to FIG. 14B, when author 1421 belonging to the category of the author tree 1429 and to another category represented by the author tree 1430 is selected, the author tree 1430 is partially displayed as shown in FIG. 14B. Accordingly, the author trees 1429 and 1430 sharing the same author 1421 can be displayed concurrently.

In one embodiment, categories are sorted such that each branch of an author tree represents a category and an author tree is formed for each account. In such an embodiment, when a user selects an author indicated by an overlapping author indicator, the author tree 1430 in FIG. 14B can be switched to the view of the author tree 1430 shown in FIG. 14C. The author tree 1430 in FIG. 14C can be an author tree of a friend indicated by the overlapping author indicator.

Functions which use e-book information of a friend that has been imported into the mobile terminal 100 and which are available to the user of the mobile terminal 100 when an e-book is read will now be described. The present embodiment is useful in cases where information, such as a bookmark, memo, or highlight, exists in e-book information of a friend for an e-book that is retained by both the friend and the user of the mobile terminal 100.

When a bookmark or highlight for an e-book retained by both the friend and the user of the mobile terminal 100 is included in the e-book information of the friend, the user of the mobile terminal 100 can be informed regarding the bookmark or highlight via various visual effects in an e-book reading mode of the mobile terminal 100, as described with respect to FIG. 15. FIG. 15 is a display screen of the touch screen 151 showing a number of bookmarks or highlights set on an e-book retained by both a friend and the user of the mobile terminal 100 in accordance with one embodiment of the present invention.

In FIGS. 15-17, the mobile terminal 100 is configured to operate in an e-book reading mode where content of an e-book is displayed on the touch screen 151 as two pages of a simulated open book respectively arranged on left and right sides. The position of each of the two pages displayed on the touch screen 151 relative to the total pages of the e-book can be represented by the thickness of each respective stack of pages under the two pages.

For example, when an e-book is configured to be read from a left page to a right page and the currently displayed pages are in an early stage of the e-book, the stack of pages under the currently displayed left page can appear thin and the stack of pages under the currently displayed right page can appear thick. Moreover, the stack of pages can be displayed such that the sides of the stack form steps or an incline to simulate the natural appearance of an opened physical book.

In FIG. 15, a popular phrase view menu 1510 is displayed in an upper region of the right page. A portion of content in an e-book that has been bookmarked or highlighted by the user of mobile terminal 100 or a friend can be displayed using a bold font when the popular phrase view menu 1510 is selected. In such a case, a phrase 1530 having a greater overlap count can be set to appear bolder than a phrase 1520 having a lesser overlap count. The overlap count can be determined based on the number of friends that have set bookmarks or highlights on a corresponding phrase.

In the embodiment of FIG. 15, a bookmark or highlight is set with respect to a phrase. In other embodiments, the highlight or bookmark can be set with respect to content other than a phrase.

Figure 17A:
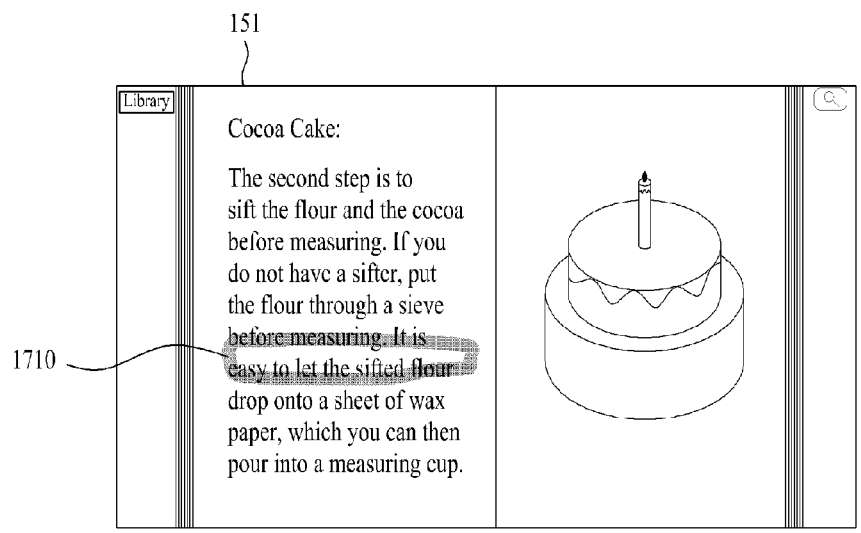
FIGS. 17A and 17B are display screens of a touch screen for displaying a number of memos or comments set on a specific portion of the same e-book in accordance with one embodiment of the present invention.
Figure 17B:
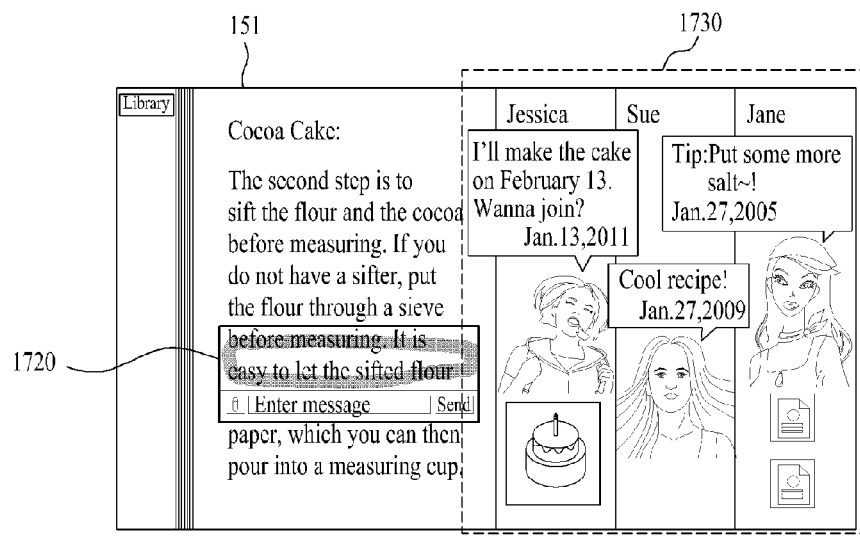

A comment or posting on a specific portion of an e-book retained by both the user of the mobile terminal 100 and a friend can be displayed in e-book information of the friend in an e-book reading mode, as described with respect to FIGS. 16 and 17. FIG. 16 is a display screen of the touch screen 151 for displaying to the user of the mobile terminal 100 a number of memos or comments set on a specific potion of an e-book retained by both the user of the mobile terminal 100 and a friend in accordance with one embodiment of the invention. FIGS. 17A and 17B are display screens of the touch screen 151 for displaying a number of memos or comments set on a specific portion of the same e-book in accordance with one embodiment of the present invention.

As shown in FIG. 16, when a comment on a specific portion of an e-book is included in e-book information shared with a friend, the comment can be displayed using a format, such as a posting on a bulletin board. When there is a comment set by a user of the mobile terminal 100 or a friend on content 1610 situated at a specific portion on a page of the e-book, the mobile terminal 100 is able to display an indicator 1620 in the vicinity of the corresponding content to indicate that the comment exists on the corresponding page.

A number of comments 1630 set on the corresponding content 1610 by a user of the mobile terminal 100 and/or one or more friends can be displayed in accordance with a prescribed reference for sorting the comments in a lower region of the corresponding page. For example, the prescribed reference can be an order based on the time at which each comment was written.

When a reply icon 1640 is selected, the user of the mobile terminal 100 can write a new comment that is related to a previously written comment. Information about an author of each comment can be displayed on the corresponding comment. Therefore, comments on a specific portion of an e-book retained by friends that have been added to an account of the user of the mobile terminal 100 can be shared in a manner similar to using a bulletin board on the Web.

As shown in FIG. 17A, when a comment on a specific portion of an e-book is included in e-book information shared with a friend, a visual effect 1710 can be displayed on the corresponding specific portion to indicate that a comment written by the friend exists. If a touch input is received on the visual effect 1710, a comment input window 1720 is displayed as shown in FIG. 17B. As also shown in FIG. 17B, comments written by friends can be displayed together with photos and/or attached files on a page 1730 opposing the page of the specific portion.

Figure 18A:
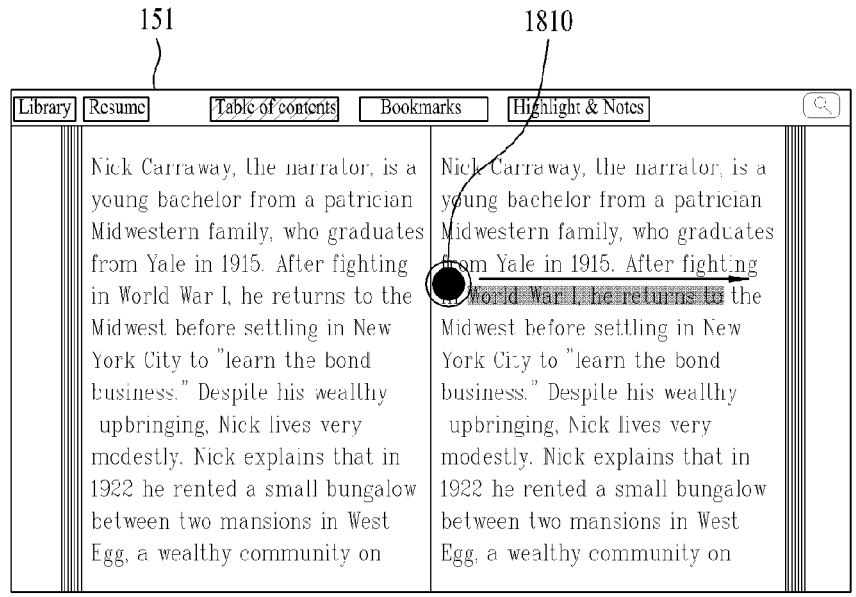
FIGS. 18A and 18B are display screens of a touch screen for specifying and operating content of an e-book displayed in association with a social network in accordance with one embodiment of the present invention.
Figure 18B:
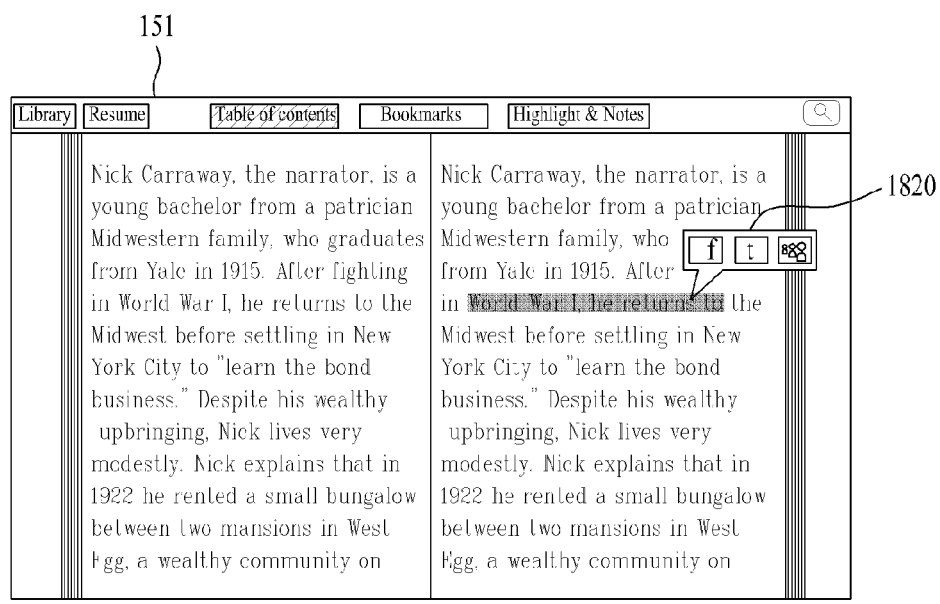

In one embodiment, an e-book reading mode of the mobile terminal 100 can operate in association with a social network service, as described with reference to FIGS. 18A and 18B. FIGS. 18A and 18B are display screens of the touch screen 151 for specifying and operating content of an e-book displayed in association with a social network in accordance with one embodiment of the present invention.

In FIG. 18A, when a user of the mobile terminal 100 intends to post content 1810 to a social network service in an e-book reading mode, the user is able to select the content 1810 using a touch input, such as a touch and drag input.

In FIG. 18B, a popup window 1820 is displayed for selecting a type of the social network service to which the selected content 1810 will be posted when selection of the content 1810 is complete. In accordance with the type of the social network service, the mobile terminal 100 can display a prescribed visual effect to indicate popularity. For example, the popularity can be indicated by scrapping the corresponding content or by enlarging or thickening a font of the corresponding content in proportion to a "retweeted" count on the e-book.

A digital rights management (DRM) function for copyright protection can be implemented in an e-book. Sharing and copying of copyright protected e-books can be prohibited.

When e-book information is imported to a bookshelf of a user of the mobile terminal 100 from a bookshelf of a friend, it is difficult for the copyright protected e-book to be copied to the bookshelf of the user.

Figure 19A:
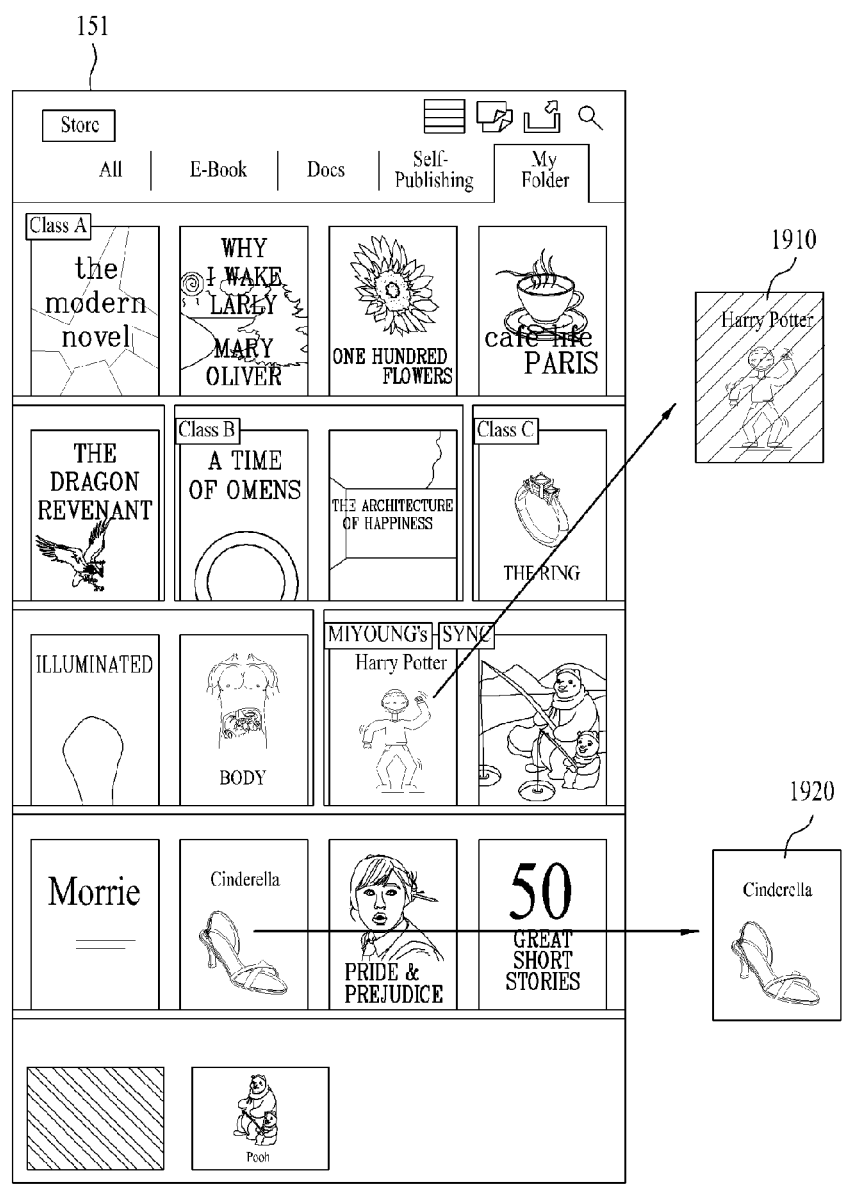
Figure 19C:
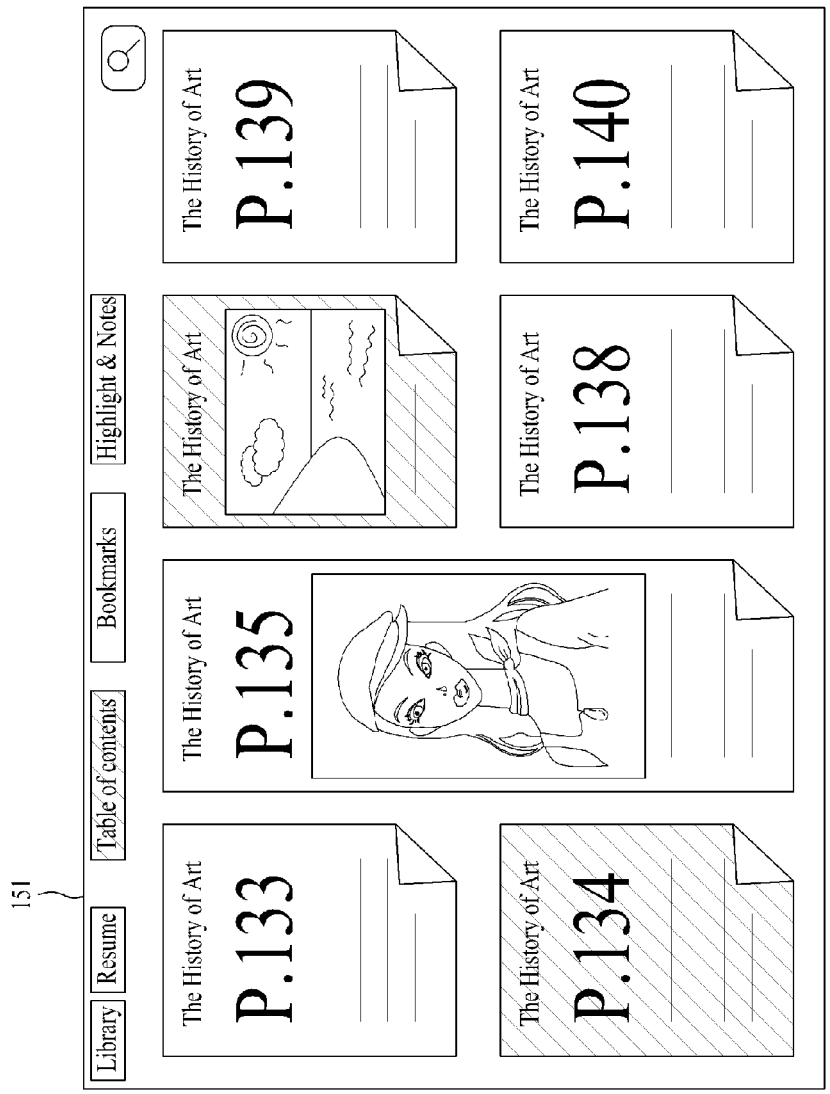

Therefore, as discussed with respect to FIGS. 19A through 19C, when a copyright protected e-book is imported to a bookshelf of a user of the mobile terminal 100 from a bookshelf of a friend, the user is informed of a presence or non-presence of copyright protection and prescribed functions are executed in the copyright protected e-book. FIGS. 19A to 19C are display screens of the touch screen 151 displaying a copyright protected e-book when e-book information is imported into the mobile terminal 100 from a bookshelf of a friend in accordance with one embodiment of the present invention.

In FIG. 19A, when e-book information that includes a copyright protected e-book is imported from a bookshelf of a friend and the imported e-books are displayed on a bookshelf of the user of the mobile terminal 100, an e-book icon 1910 representing such a copyright protected e-book can be displayed in black and white. As indicated in FIG. 19A, an e-book icon 1920 representing an imported e-book that is not copyright protected is not displayed in black and white. A symbol, such as "©", indicating that an e-book is copyright protected can be displayed on the e-book icon representing the copyright protected e-book.

When the user of the mobile terminal 100 selects an e-book that is not copyright protected from a plurality of e-books imported to the bookshelf of the user of the mobile terminal 100 from the bookshelf of a friend, a reading mode for the corresponding e-book is executed. However, when the e-book is copyright protected, only a sample page provided by a distributor, a link for purchasing the e-book, or a bookmark, memo, or highlight written by a friend can be displayed.

As shown in FIG. 19B. when a copyright protected e-book is selected from a number of e-books imported to the bookshelf of the user of the mobile terminal 100 from the bookshelf of a friend, the mobile terminal 100 can display the cover of the corresponding e-book and one or more indicator icons 1930 of an index tab type to indicate a presence of a bookmark, memo, or highlight set by the friend.

As shown in FIG. 19C, a collective view mode can be executed when one of the one or more indicator icons 1930 is selected. In the collective view mode, the bookmark, memo, or highlight set by the friend retaining the copyright protected e-book can be displayed together. A portion of content or a page that has a corresponding bookmark, memo, or highlight is captured and then enumerated in a prescribed form for viewing by the user of the mobile terminal 100. The mobile terminal 100 can select the displayed information as a bookmark or a memo only via a menu selection situated in an upper region of the touch screen 151.

In the previously described embodiments, a single bookshelf is set for each account. However, a number of bookshelves can exist in accordance with a number of e-books or settings. When an entire bookshelf cannot be displayed on the touch screen 151, the bookshelf can be scrolled via a flicking touch input to enable viewing of the portions of the bookshelf that exceed the displayable area of the touch screen 151.

It should be understood that the previously described menu configurations, arrangement patterns, and icon shapes are only intended as examples. Furthermore, the present invention can be modified to perform functions similar to those previously discussed.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments of the mobile terminal capable of performing the function for sharing the e-book information with other users and a method for controlling the mobile terminal are achieved by a combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A mobile terminal comprising:
   a touch screen;
   a memory;
   a communication module; and
   a controller configured to:
   display information and receive a user input on the touch screen,
   store in the memory a first list including a first electronic book (e-book) of a first user and corresponding reading progress information of the first e-book by the first user,
   receive e-book information including a second list including a second e-book of a second user and corresponding reading progress information of the second e-book by the second user,
   simultaneously display icons in a common bookshelf on the touch screen, the simultaneously displayed icons including:
      an icon corresponding to an e-book only in the first list along with an identifier of the first user, and
      an icon corresponding to an e-book included in both the first list and the second list along with the identifier of the first user and an identifier of the second user; and
   when a first command is received, simultaneously display within the common bookshelf reading progress information corresponding to the e-book only in the first list and reading progress information corresponding to the e-book included in both the first list and the second list,
   wherein the displayed reading progress information corresponding to the e-book included in both the first list and the second list includes a simultaneous display of a reading progress of the first user and a reading progress of the second user.

2. The mobile terminal of claim 1, wherein
   the simultaneously displayed icons further include an icon corresponding to an e-book only in the second list along with the identifier of the second user;

the simultaneously displayed reading progress information further includes reading progress information corresponding to the e-book only in the second list;

the icon corresponding to the e-book only in the first list is displayed in a first region of the common bookshelf;

the icon corresponding to the e-book only in the second list is displayed in a second region of the common bookshelf different from the first region; and the icon corresponding to the e-book in both the first and second lists is displayed in either the first or second region of the common bookshelf.

3. The mobile terminal of claim 2, wherein:
the displayed icon has a shape of a book.

4. The mobile terminal of claim 3, wherein the controller is further configured to display an indicator on the displayed icon, the indicator indicating a presence of the reading progress information corresponding to each of the displayed icons.

5. The mobile terminal of claim 4, wherein, for the icon corresponding to the e-book included in both the first list and the second list:
the indicator comprises a first indicator corresponding to the reading progress of the first user and a second indicator corresponding to the reading progress of the second user; and
the controller is further configured to display the first indicator differently from the second indicator.

6. The mobile terminal of claim 5, wherein the first command comprises a touch input for moving either the first indicator to the second indicator or the second indicator to the first indicator.

7. The mobile terminal of claim 3, wherein at least one of the reading progress information includes information of multimedia content that was played while reading the corresponding e-book.

8. The mobile terminal of claim 3, wherein the e-book information further includes at least one of copyright information, comment information regarding a comment written by the second user, reading frequency information or reading speed information.

9. The mobile terminal of claim 8, wherein the controller is further configured to display each item of information included in the e-book information on a corresponding icon using visual effects that are different from one another.

10. The mobile terminal of claim 3, wherein:
the first user is identified by a first account and the second user is identified by a second account; and
the controller is further configured to display an account list in a prescribed form on the touch screen when a second command is received via the touch screen, the account list including the second account which was added before the first account.

11. The mobile terminal of claim 10, wherein the account list comprises at least one of a photo of the second user, a name of the second user, an identification (ID) of the second user, an e-book recently purchased by the second user or an e-book currently being read by the second user.

12. The mobile terminal of claim 11, wherein the account list further comprises at least one recommended account in addition to the second account.

13. The mobile terminal of claim 10, wherein the controller is further configured to display the icon corresponding to an e-book only in the second list and any reading progress of the second user when the second user account is selected from the account list such that the common bookshelf includes any e-book included in the second list along with corresponding reading progress of the second user.

14. The mobile terminal of claim 13, wherein the controller is further configured to display a selection menu for selecting e-books from the second list when a third command is received via the touch screen.

15. The mobile terminal of claim 1, wherein the controller is further configured to apply a preset visual effect on an icon corresponding to any e-book included in the second list when a protection attribute has been applied to the e-book included in the second list.

16. The mobile terminal of claim 15, wherein the protection attribute comprises a digital rights management (DRM) attribute.

17. The mobile terminal of claim 15, wherein the preset visual effect comprises a predefined color indicating that the protection attribute has been applied.

18. The mobile terminal of claim 1,
wherein the e-book information further includes at least one of:
bookmark information for the second e-book,
copyright information of the second e-book,
comment information regarding a comment written by the second user about the second e-book,
reading frequency information of the second e-book by the second user, or
reading speed information of the second e-book by the second user; and
wherein the controller is further configured to:
display at least one of the bookmark information or the comment information about the second e-book in a prescribed form when the second e-book is selected from the second list; or
display at least one page of the second e-book when the second e-book is selected from the second list and a protection attribute has not been applied to the second e-book.

19. The mobile terminal of claim 18, wherein the controller is further configured to display at least one portion of a page of the second e-book when the at least one of the bookmark information or the comment information about the second e-book is displayed.

20. The mobile terminal of claim 18, wherein the controller is further configured to display a link to a distributor of the second e-book when the second e-book is selected from the second list.

21. A method of controlling a mobile terminal having a touch screen, the method comprising:
storing, by the mobile terminal, a first list including a first electronic book (e-book) of a first user and corresponding reading progress information of the first e-book by the first user;
receiving, by the mobile terminal, e-book information including a second list including a second e-book of a second user and corresponding reading progress information of the second e-book by the second user;
simultaneously displaying icons in a common bookshelf on the touch screen, the simultaneously displayed icons including:
an icon corresponding to an e-book only in the first list along with an identifier of the first user, and
an icon corresponding to an e-book included in both the first list and the second list along with the identifier of the first user and an identifier of the second user; and
when a first command is received, simultaneously displaying within the common bookshelf reading progress information corresponding to the e-book only in the first list and reading progress information corresponding to the e-book included in both the first list and the second list,
  wherein the displayed reading progress information corresponding to the e-book included in both the first list and the second list includes a simultaneous display of a reading progress of the first user and a reading progress of the second user.

22. The method of claim 21, wherein the reading progress of the first user and the reading progress of the second user each comprise a corresponding line graph with respect to a table of contents of the e-book included in both the first list and the second list.

23. The method of claim 22, wherein a slope of the line graph corresponds to a reading speed of the first or second user.

24. The method of claim 21, further comprising:
  applying a preset visual effect on an icon corresponding to any e-book included in the second list when a protection attribute has been applied to the e-book included in the second list.

25. The method of claim 24, wherein the preset visual effect is a predefined color indicating that the protection attribute has been applied.

26. The method of claim 24, wherein the e-book information further includes at least one of:
  bookmark information for the second e-book,
  copyright information the second e-book,
  comment information regarding a comment written by the second user about the second e-book,
  reading frequency information of the second e-book by the second user, or
  reading speed information of the second e-book by the second user.

27. The method of claim 26, further comprising:
  displaying at least one of the bookmark information or the comment information about the second e-book in a prescribed form when the second e-book is selected from the second list; or
  displaying at least one page of the second e-book when the second e-book is selected from the second list and a protection attribute has not been applied to the second e-book.

28. The method of claim 27, further comprising:
  displaying at least one portion of a page of the second e-book when the at least one of the bookmark information or the comment information about the second e-book is displayed.

29. The method of claim 24, wherein the protection attribute comprises a digital rights management (DRM) attribute.

30. The method of claim 21, wherein
  the simultaneously displayed icons further include an icon corresponding to an e-book only in the second list along with the identifier of the second user;
  the simultaneously displayed reading progress information further includes reading progress information corresponding to the e-book only in the second list;
  the icon corresponding to the e-book only in the first is displayed in a first region of the common bookshelf;
  the icon corresponding to the e-book only in the second list is displayed in a second region of the common bookshelf different from the first region; and
  the icon corresponding to the e-book in both the first and second lists is displayed in either the first or second region of the common bookshelf.

31. The method of claim 30, wherein:
  the displayed icon has a shape of a book.

32. The method of claim 30, further comprising:
  displaying the icon corresponding to an e-book only in the second list and any reading progress of the second user when the second user account is selected from the account list such that the common bookshelf includes any e-book included in the second list along with corresponding reading progress of the second user.

* * * * *